(12) United States Patent
Brown et al.

(10) Patent No.: US 6,419,259 B1
(45) Date of Patent: Jul. 16, 2002

(54) DEVICE FOR RECEIVING AND SECURING A BALL

(76) Inventors: David Richard Brown, 1714; Stacy Ray Brown, 1603 both of Southgate; Danny Richard Brown, 4413 Brookdale, all of Brownwood, TX (US) 76801

( * ) Notice: Subject to any disclaimer, the term of this patent is extended or adjusted under 35 U.S.C. 154(b) by 0 days.

(21) Appl. No.: 09/271,015

(22) Filed: Mar. 17, 1999

Related U.S. Application Data

(60) Provisional application No. 60/078,993, filed on Mar. 23, 1998, and provisional application No. 60/116,060, filed on Jan. 15, 1999.

(51) Int. Cl.[7] .................................................. B60D 1/06
(52) U.S. Cl. ...................................................... 280/512
(58) Field of Search .................................. 280/511, 512, 280/513

(56) References Cited

U.S. PATENT DOCUMENTS

| | | | |
|---|---|---|---|
| 1,953,365 A | | 4/1934 | Reetz |
| 2,078,851 A | | 4/1937 | Hovey |
| 2,090,113 A | | 9/1937 | Dayton |
| 2,178,094 A | * | 10/1939 | Berluti |
| 2,204,882 A | * | 6/1940 | Berluti |
| 2,237,166 A | * | 4/1941 | Schoenrock ............... 280/511 |
| 2,435,024 A | * | 1/1948 | Wagner |
| 2,532,676 A | * | 12/1950 | Shaieb |
| 2,542,643 A | | 2/1951 | Duncan |
| 2,726,099 A | * | 12/1955 | Nunn, Jr. |
| 3,362,728 A | | 1/1968 | Wing |
| 3,677,564 A | * | 7/1972 | Kothmann |
| 3,888,517 A | * | 6/1975 | Ray ............................ 280/512 |
| 3,923,112 A | * | 12/1975 | Goodgame ............... 180/24.11 |
| 5,147,096 A | | 9/1992 | Rogers |

FOREIGN PATENT DOCUMENTS

| | | | | |
|---|---|---|---|---|
| FR | 2 420 441 | * | 11/1979 | .................. 280/511 |
| GB | 2 056 929 | * | 3/1981 | .................. 280/512 |

* cited by examiner

Primary Examiner—Kevin Hurley
(74) Attorney, Agent, or Firm—George S. Gray

(57) ABSTRACT

A coupling device is provided for receiving and securing a ball, the ball being attached to the structure to be coupled, such as a tow vehicle in the case of a trailer hitch application. Various embodiments of the device for both tongue and "goose neck" trailer hitch applications are included, which provide for simple and effective latching and unlatching. Hands free latching is provided for all coupling embodiments. A pivoting ball support is rotated and displaced as the ball enters the device, and is returned to a position whereby the ball is prevented from exiting the device. Various provisions are made for retaining the pivoting ball support in this position after such latching has occurred. Provisions for unlatching include various handles and hand pushed structure.

70 Claims, 29 Drawing Sheets

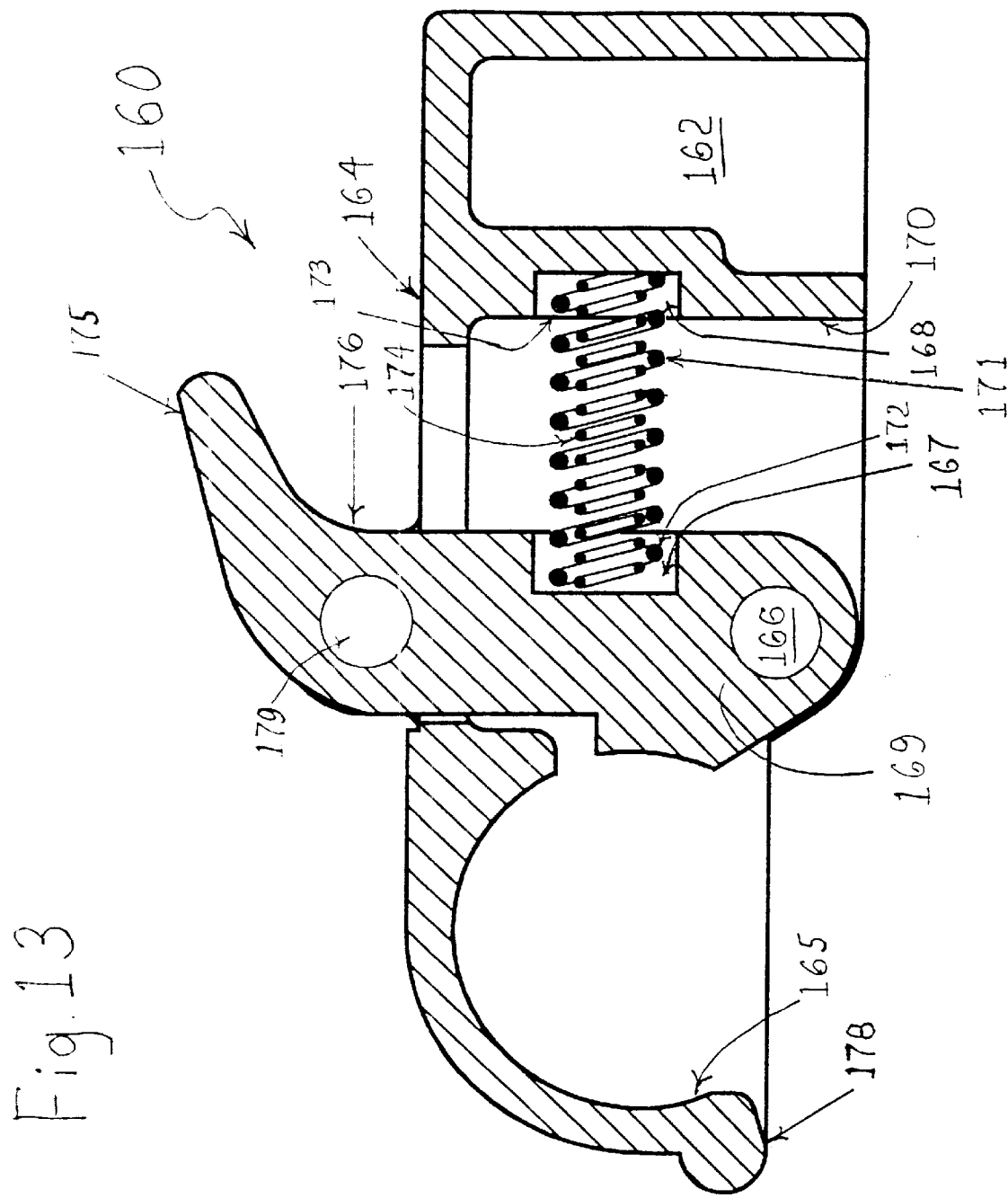

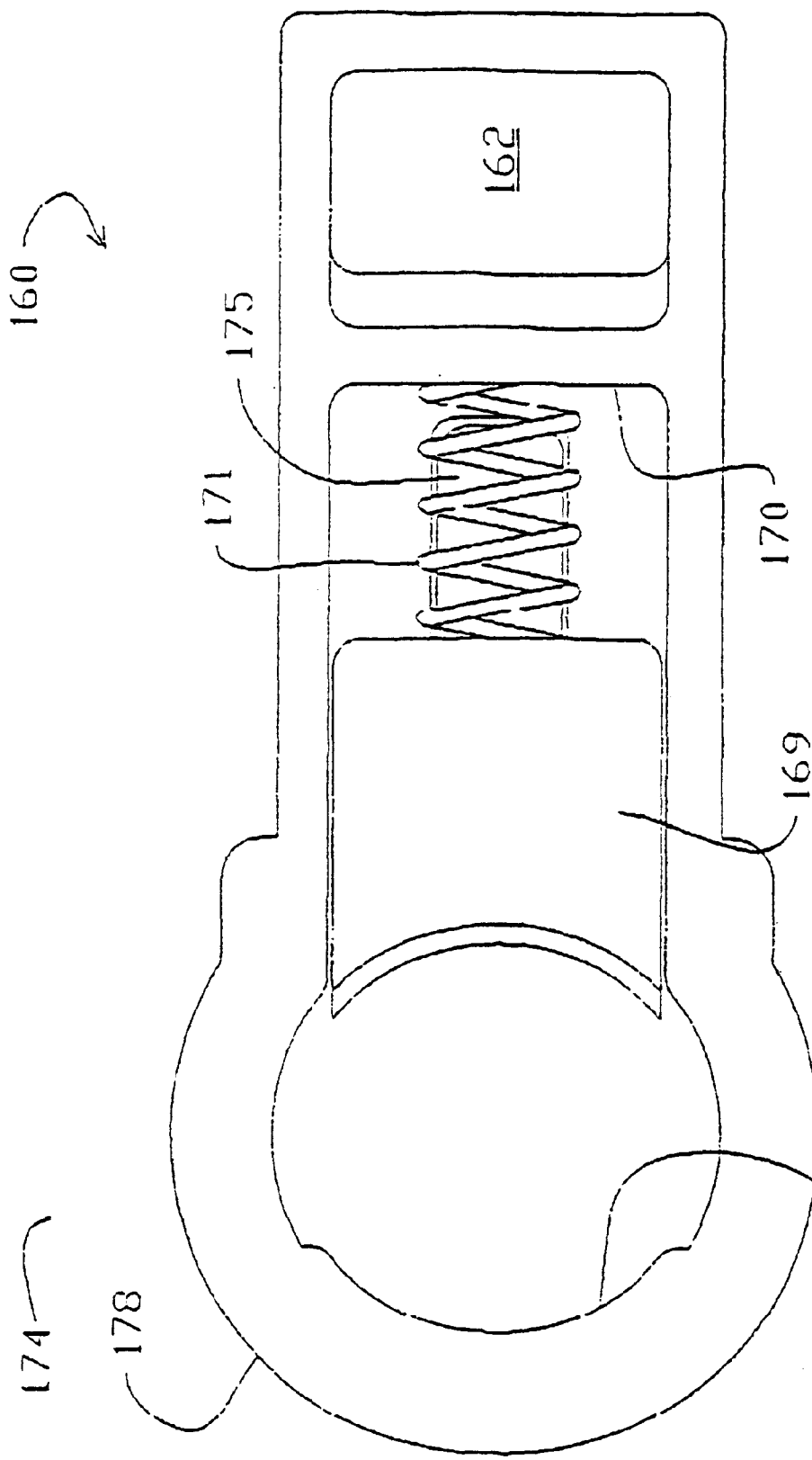

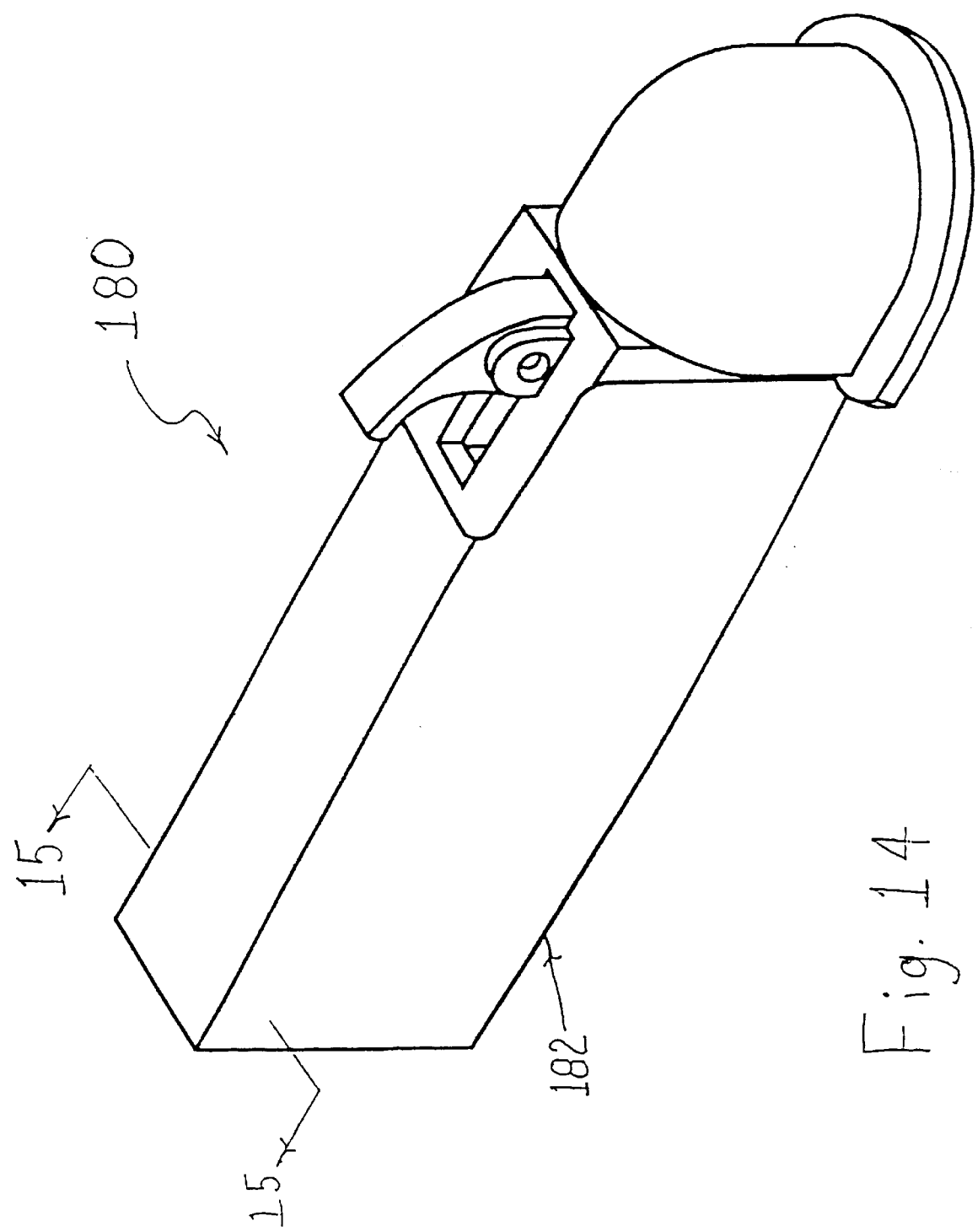

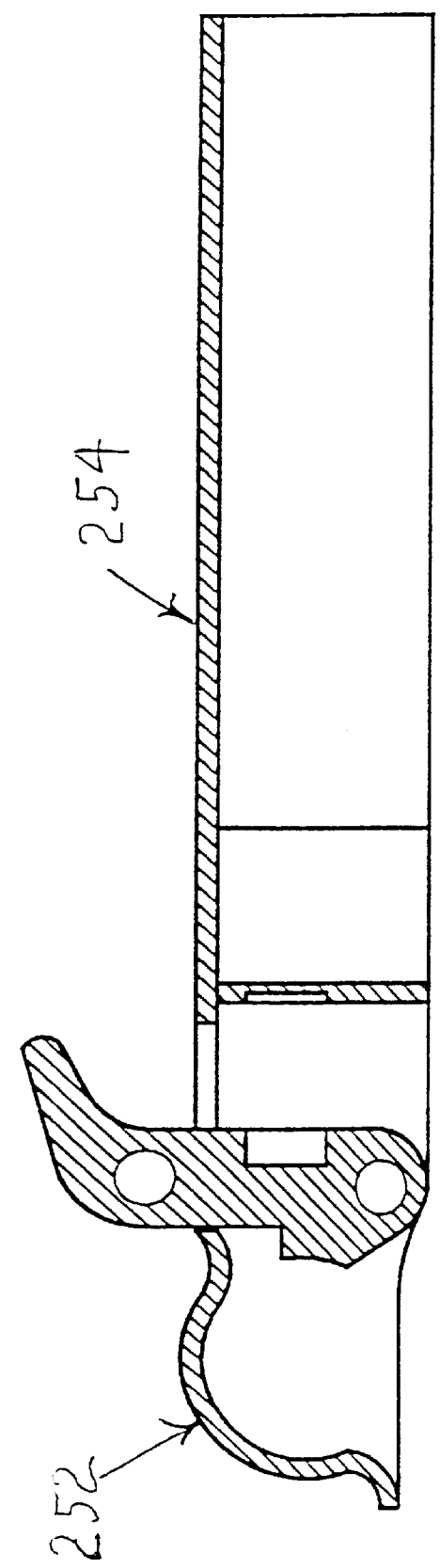

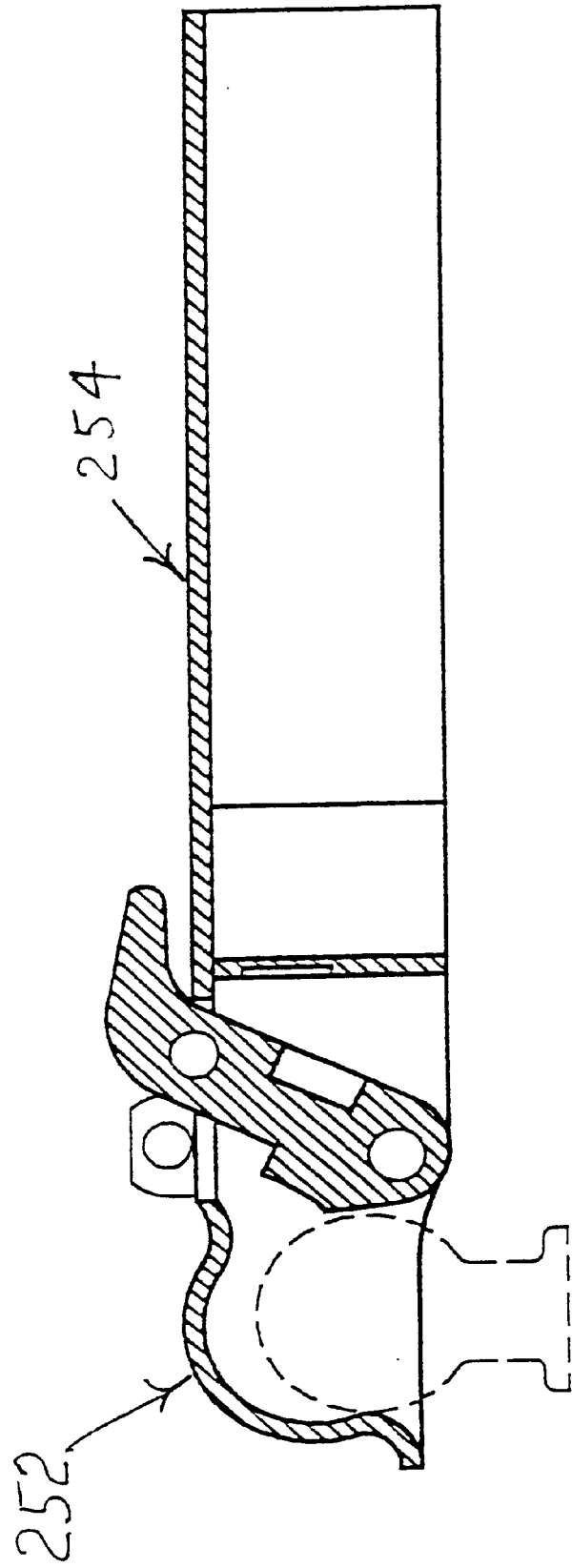

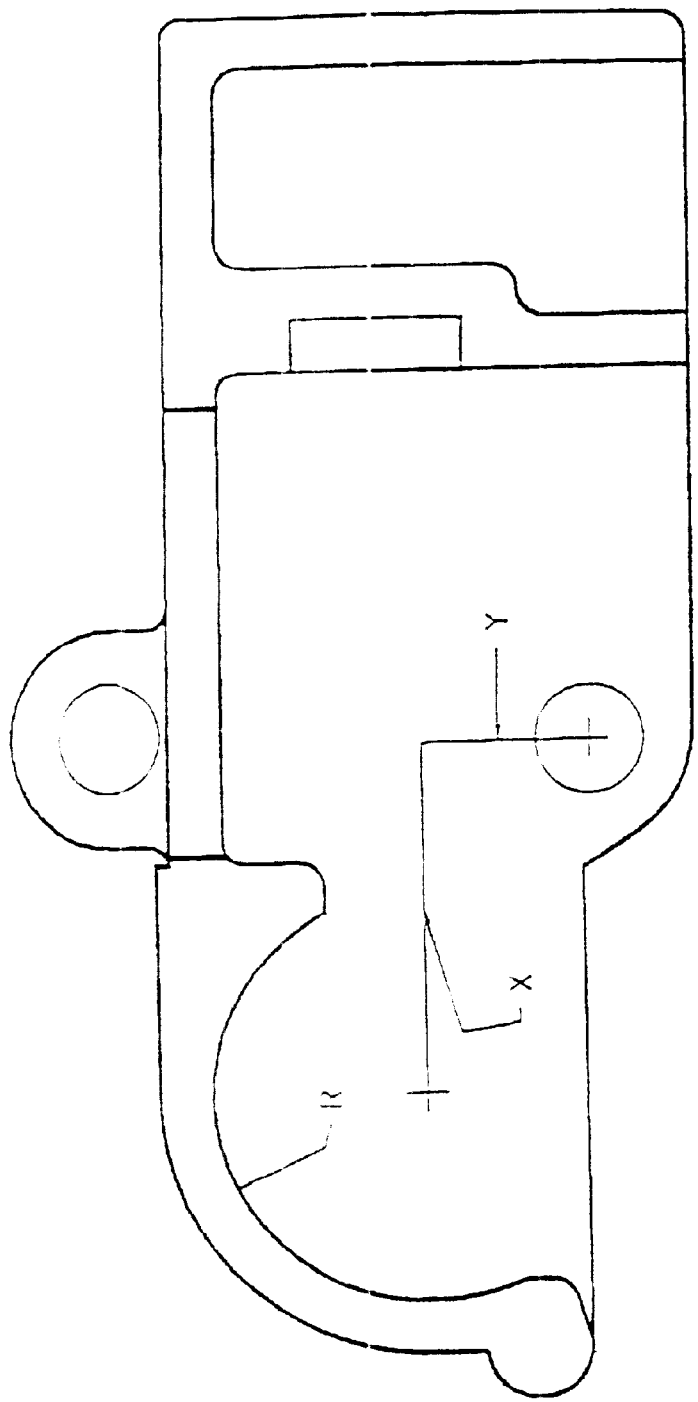

DEVICE FOR RECEIVING AND SECURING A BALL

REFERENCE TO PRIOR PROVISIONAL APPLICATIONS

The present application is a conversion of a provisional application to a nonprovisional application. The provisional application No. is 60/078,993 filed Mar. 23, 1998. The title of the application is "Device For Receiving and Securing A Hitch Ball." The inventor is David Richard Brown. Applicant claims Mar. 23, 1998, as his filing date.

This application also converts a second provisional patent application to a nonprovisional application. This second provisional application is application No. 60/116,060, having a filing date of Jan. 15, 1999. The title of the application is "Device For Receiving and Securing A Hitch Ball." The inventor is David Richard Brown. This second provisional application incorporated and supplemented the first provisional application.

BACKGROUND OF THE INVENTION

This invention relates to a simple and convenient, tongue mounted receiving end of a "ball" hitch, of the type commonly used for trailers, recreational vehicles, and boats. The device is also adaptable to general coupling applications, e.g., gate and door fasteners, shelving, and other applications wherein it is desirable to couple two objects together simply and quickly.

With regard to hitches in particular, many hitch devices are currently available which connect to the typical hitch ball. However, most of these include unduly complicated mechanisms, with many having a multiplicity of parts. Furthermore, most require manual manipulation of the device during the attachment process. In some, manual input is required to move the device from the open to the closed position.

It is a principal object of this invention to provide an easy-to-use hitch ball receiving mechanism, having an uncomplicated locking mechanism and a minimum of moving parts.

Another object is to provide a mechanism which requires no manual manipulation during the process in which the hitch ball is secured.

SUMMARY OF THE INVENTION

My invention is an easy-to-use coupling device having an uncomplicated latching mechanism and a minimum of moving parts. It is particularly suited for receiving a typical trailer hitch ball. My device requires no manual manipulation of the latching mechanism during the attachment of the device to a typical hitch ball.

My invention includes, without implied limitation of the claims, a device comprising a frame, with the frame having a front and rear interior section, and a frame opening, all being generally sized to allow the entry and close reception of a typical round hitch ball. A pivoting ball support has a pivot point attached to the frame such that the pivoting ball support moves in a substantially perpendicular manner with respect to the hitch ball. The face of the pivoting ball support is moved by such pivoting action from a first to a second position, the first position trapping the hitch ball within the frame front interior section, and the second position allowing the hitch ball to pass through the frame opening out of the frame interior.

Pivoting ball support movement resistance means resists movement of the pivoting ball support face from the first position to the second position.

Pivoting ball support forced rotation means allows the pivoting ball support face to be manually moved from the first to the second position.

In an alternative embodiment the pivoting ball support movement resistance means is replaced by pivoting ball support movement prevention means, such that movement of the pivoting ball support face, from its first position to its second position, is prevented.

Many features are contemplated by my invention, and may be included on one or more of the numerous and varied embodiments available.

The pivoting ball support face and pivoting ball support pivot point can be configured, with respect to the frame front interior section, such that hitch ball motion causes the pivoting ball support face to rotate around the pivoting ball support pivot point. In turn, this causes the pivoting ball support face to stay in, or move toward, the first position.

The pivoting ball support movement resistance means can comprise one or more springs positioned against and between the pivoting ball support and the frame interior section interior surface. Compression of the spring or springs would be required to move the pivoting ball support face from its first to its second position. This feature allows a "hands free" attachment since the spring action moves the pivoting ball support face back to its first position, the pivoting ball support face having been previously displaced to its second position by the hitch ball as the hitch ball entered the device.

The device may include a frame lip which is positioned to extend beneath a portion of the hitch ball, when the hitch ball is positioned within the frame front interior section. The frame lip may extend all portions of the front, sides, or both, of the frame front interior section.

The device may include a rear part of the frame front interior section interior surface, which extends downwardly between the front and rear interior sections. When the fully inserted hitch ball tries to move in a rearward direction, substantial portions of the hitch ball will encounter this rear part.

The frame lip and the frame front interior section interior surface rear part can be sized and shaped such that a line passing between the rearmost edge of each, passes below the center of the ball, when the line is drawn on a plane cut through the center of the fully inserted hitch ball.

The frame lip and the frame front interior section interior surface can be shaped and sized such that, during insertion, the hitch ball is urged to a position where a portion of the hitch ball is above the frame lip at the completion of the insertion process.

The frame lip may be of a concave shape, making a frame lip face that lies substantially flush with the fully inserted hitch ball.

The pivoting ball support face may be shaped and sized to closely follow the circumference of the hitch ball, when the circumference is in a plane cut through the center of the fully inserted hitch ball.

The frame opening can have a rear section corresponding generally with the frame rear interior section. The pivoting ball support can be sized and positioned such that its bottom end does not extend below the frame opening rear section.

The pivoting ball support forced rotation means can include a handle being attached to the pivoting ball support such that movement of the handle causes rotation of the pivoting ball support about its pivot point. Various embodiments can include single handles attached to the pivoting ball support pivot point or the pivoting ball support top extension, two handles attached at either end of the pivoting ball support pivot point, respectively, one handle connecting to both ends of the pivoting ball support pivot point, one or more handles disposed in a rearward direction with respect to the frame, one or more handles running in a forward direction with respect to the frame, handles which lie substantially flush to the frame, handles having gripping devices and attachments, and handles having a cross member oriented in a "T" shape.

A handle hook can also be included, which would receive and hold the handle.

One or more handles can also be configured such that the handle lies at an angle with respect to the longitudinal axis of the frame. This angle can be sufficient such that the handle can be gripped even if the frame is substantially flush to a horizontal surface.

The pivoting ball support movement prevention means can include a slot in the top of the frame, through which the pivoting ball support top extension protrudes. A hole in the pivoting ball top extension accepts a pin, and the hole is situated with respect to the frame such that the pin will be against the frame when the pivoting ball support face is in its first position.

The frame can have one or more top extensions which have holes aligning with the pivoting ball support top extension hole when the pivoting ball support face is in its first position. A pin or a lock in these aligned holes will prevent movement of the pivoting ball support.

A pivoting slot plug can be attached to the top of the frame. The slot plug can be rotated into and closely received by the frame slot. When in the frame slot, the slot plug prevents movement of the pivoting ball support.

According to one embodiment, there is provided an apparatus for receiving and securing a hitch ball, comprising: a frame, the frame having an interior, the frame interior having a front section and a rear section, the frame front interior section being shaped and sized for closely receiving portions of a generally round hitch ball, the frame further having a downwardly facing opening, the frame opening being shaped and positioned to allow hitch ball passage into the frame front interior section; a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the hitch ball positioned in the frame front interior section, the pivoting ball support further having a face, the pivoting ball support face being movable from a first position to a second position, the pivoting ball support face first position being such that the pivoting ball support face is at least partially beneath a portion of the hitch ball when the hitch ball is within the frame front interior section, the frame front interior section being sized and shaped such that the pivoting ball support face prevents the hitch ball from passing through the frame opening; pivoting ball support movement resistance means, such that movement of the pivoting ball support face from its first position to its second position is resisted; and pivoting ball support forced rotation means, such that the pivoting ball support face can be manually moved from the first to the second position.

According to a further embodiment, the pivoting ball support movement resistance means comprises the pivoting ball support pivot point and the pivoting ball support face, the pivoting ball support pivot point and the pivoting ball support face being configured with respect to the frame front interior section, such that the force exerted by the hitch ball on the pivoting ball support face tends to rotate the pivoting ball support face about the pivoting ball support pivot point in a manner such that the pivoting ball support face stays in, or is moved toward, the first position.

According to a further embodiment, the pivoting ball support movement resistance means further comprises the frame, the frame further having a frame rear interior section interior surface, and a spring, the spring having a first and second end, the spring's first end being positioned against the pivoting ball support, the spring's second end being positioned against the frame rear interior section interior surface.

According to a further embodiment, the apparatus further comprises the frame, the frame further having a lip, the frame lip being shaped and positioned to extend beneath a portion of the hitch ball positioned in the frame front interior section.

According to a further embodiment, the apparatus further comprises the frame, the frame further having a frame front interior section interior surface, the frame front interior section interior surface having a rear part extending downwardly between the frame front and rear interior sections, such that, when the fully inserted hitch ball seeks to move in a rearward direction, substantial portions of the rear of the hitch ball will encounter the frame front interior section interior surface rear part.

According to a further embodiment, the apparatus further comprises the frame lip, the frame lip further having a rearmost edge, and the frame front interior section interior surface, the frame front interior section interior surface further having a rearmost edge, the frame lip rearmost edge and the frame front interior section interior surface rearmost edge being sized and shaped such that a line between such edges, lying on a plane cut through the center of the fully inserted hitch ball, passes through or below the center of the ball.

According to a further embodiment, the apparatus further comprises the frame lip and the frame front interior section interior surface, the frame lip and the frame front interior section interior surface being shaped and sized such that, as the hitch ball is inserted into the frame front interior section, the frame front interior section interior surface urges the hitch ball to a position such that a portion of the hitch ball is above the frame lip when the hitch ball is fully inserted.

According to a further embodiment, the apparatus further comprises the frame, the frame further having a frame front interior section interior surface, the frame lip extending, in a generally arc shaped fashion, on and along the frame front interior section interior surface, approximately 45 degrees on either side of the longitudinal axis of the frame, when measured on a circle having a center coincident with the fully inserted hitch ball's center.

According to a further embodiment, the apparatus further comprises the frame lip, the frame lip further having a frame lip face, the frame lip face being generally concave and sized such that the frame lip face is substantially flush with the fully inserted hitch ball.

According to a further embodiment, the apparatus further comprises the frame, the frame further having a frame front interior section interior surface, the frame front interior section interior surface having a rear part extending downwardly between the frame front and rear interior sections, such that, when the fully inserted hitch ball seeks to move in a rearward direction, substantial portions of the rear of the hitch ball will encounter the frame front interior section interior surface rear part.

According to a further embodiment, the frame front interior section interior surface rear part extends from 15 degrees to 90 degrees along the circumference of a circle having a center coincident with the center of the fully inserted hitch ball.

According to a further embodiment, the pivoting ball support movement resistance means further comprises the frame, the frame further having a frame rear interior section interior surface, and a spring, the spring having a first and second end, the spring's first end being positioned against the pivoting ball support, the spring's second end being positioned against the frame rear interior section interior surface.

According to a further embodiment, the apparatus further comprises the frame, the frame further having a lip, the frame lip being shaped and positioned to extend beneath a portion of the hitch ball positioned in the frame front interior section.

According to a further embodiment, the apparatus further comprises the frame lip, the frame lip further having a rearmost edge, and the frame front interior section interior surface, the frame front interior section interior surface further having a rearmost edge, the frame lip rearmost edge and the frame front interior section interior surface rearmost edge being sized and shaped such that a line between such edges, lying on a plane cut through the center of the fully inserted hitch ball, passes below the center of the ball.

According to a further embodiment, the apparatus further comprises the frame lip and the frame front interior section interior surface, the frame lip and the frame front interior section interior surface being shaped and sized such that, as the hitch ball is inserted into the frame front interior section, the frame front interior section interior surface urges the hitch ball to a position such that a portion of the hitch ball is above the frame lip when the hitch ball is fully inserted.

According to a further embodiment, the apparatus further comprises the pivoting ball support face, the pivoting ball support face being further shaped and sized to closely follow the circumference of the adjacent portions of the hitch ball, in a plane cut through the center of the fully inserted hitch ball.

According to a further embodiment, the pivoting ball support face follows the hitch ball circumference through at least 30 degrees.

According to a further embodiment, the apparatus further comprises the pivoting ball support and the frame opening, the pivoting ball support further having a bottom end and the frame opening further having a rear section corresponding generally with the frame rear interior section, the pivoting ball support being further sized and positioned such that the pivoting ball support bottom end does not extend below the frame opening rear section.

According to a further embodiment, the pivoting ball support movement resistance means comprises: the frame, the frame further having a frame rear interior section interior surface; and a plurality of springs, the springs each having a first and second end, each spring's first end being positioned against the pivoting ball support, each spring's second end being positioned against the frame rear interior section interior surface.

According to a further embodiment, the pivoting ball support forced rotation means comprises a handle, the handle being attached to the pivoting ball support such that movement of the handle causes rotation of the pivoting ball support about the pivoting ball support pivot point.

According to a further embodiment, the pivoting ball support is positioned such that its clockwise rotation about the pivoting ball support pivot point moves the pivoting ball support from its first position to its second position.

According to a further embodiment, the handle is attached to the pivoting ball support above the pivoting ball support pivot point.

According to a further embodiment, the apparatus further comprises the pivoting ball support pivot point, the pivoting ball support pivot point having a first and second end, and two handles, the first handle being attached to the pivoting ball support pivot point first end, the second handle being attached to the pivoting ball support pivot point second end.

According to a further embodiment, the apparatus further comprises the pivoting ball support pivot point, the pivoting ball support pivot point having a first and second end, and the handle, the handle being attached to the pivoting ball support pivot point first end and second end.

According to a further embodiment, the handle is shaped and configured such that it runs in a generally rearward direction along the frame when the pivoting ball support face is in its first position.

According to a further embodiment, the handle is shaped and configured such that it runs in a generally forward direction along the frame when the pivoting ball support face is in its first position.

According to a further embodiment, the handle is shaped and configured such that it runs substantially flush to the frame when the pivoting ball support face is in its first position.

According to a further embodiment, the handle is "T" shaped.

According to a further embodiment, the apparatus further comprises handle gripping means.

According to a further embodiment, the apparatus further comprises a handle hook, the handle hook being attached to the frame, the handle hook being shaped and positioned such that the handle is received and held by the handle hook when the pivoting ball support face is in its first position.

According to a further embodiment, the handle is shaped and configured such that, with respect to the horizontal, it runs at an angle of sufficient magnitude to allow the handle to be readily gripped when the frame is positioned substantially flush to a horizontal surface and the pivoting ball support face is in its first position.

According to a further embodiment, the referenced angle is 10 to 90 degrees from the horizontal.

According to a further embodiment, the apparatus further comprises pivoting ball support movement prevention means, such that movement of the pivoting ball support face from the first position to the second position is prevented.

According to a further embodiment, the apparatus further comprises a frame exterior lip, the frame exterior lip being attached to the frame proximate the frame downwardly facing opening, the frame exterior lip further extending radially from the frame downwardly facing opening, the frame exterior lip being tapered downwardly as it extends.

According to a further embodiment, the apparatus further comprises a pivoting ball support stop, the pivoting ball support stop being attached to the frame interior rear section and positioned such that movement of the pivoting ball support is halted when the pivoting ball support encounters the pivoting ball support stop.

According to a further embodiment, the pivoting ball support rotates with respect to the pivoting ball support pivot point, the pivoting ball support pivot point being fixed with respect to the frame.

According to a further embodiment, the apparatus further comprises a channel structure, the channel structure being attached to the frame and extending rearwardly, the channel structure being shaped to closely receive all or a portion of each of three sides of a rectangular structure.

According to a further embodiment, the apparatus further comprises an A-frame structure, the channel structure being attached to the frame and extending rearwardly, the A-frame structure being shaped to closely receive a V-shaped structure.

According to one embodiment, there is provided an apparatus for receiving and securing a hitch ball, comprising: a frame, the frame having an interior, the frame interior having a front section and a rear section, the frame front interior section being shaped and sized for closely receiving portions of a generally round hitch ball, the frame further having a downwardly facing opening, the frame opening being shaped and positioned to allow hitch ball passage into the frame front interior section; a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the hitch ball positioned in the frame front interior section, the pivoting ball support further having a face, the pivoting ball support face being movable from a first position to a second position, the pivoting ball support face first position being such that the pivoting ball support face is at least partially beneath a portion of the hitch ball when the hitch ball is within the frame front interior section, the frame front interior section being sized and shaped such that the pivoting ball support face prevents the hitch ball from passing through the frame opening; pivoting ball support movement prevention means, such that movement of the pivoting ball support face from the first position to the second position is prevented; and pivoting ball support forced rotation means, such that the pivoting ball support face can be manually moved from the first to the second position after disablement of the pivoting ball support movement prevention means.

According to a further embodiment, the pivoting ball support movement prevention means comprises the frame, the frame further having a slot, and the pivoting ball support, the pivoting ball support further having a top extension, the pivoting ball support top extension having a hole, the pivoting ball support top extension being configured such that the pivoting ball support top extension extends through the frame slot, the amount of such extension being limited such that a pin of substantially the same diameter as the pivoting ball support top extension hole, will be against the frame when the pivoting ball support face is in its first position and the pin is inserted in the pivoting ball support top extension hole.

According to a further embodiment, the pivoting ball support forced rotation means comprises the frame, the frame further having a slot, and the pivoting ball support, the pivoting ball support having a top extension, the pivoting ball support top extension being configured such that the pivoting ball support top extension extends through the frame slot.

According to a further embodiment, the pivoting ball support movement prevention means comprises: the frame, the frame further having a slot and a top extension, the frame top extension having a hole; and the pivoting ball support, the pivoting ball support further having a top extension, the pivoting ball support top extension having a hole, the pivoting ball support top extension being configured such that the pivoting ball support top extension extends through the frame slot, the frame top extension being positioned on the frame such that the pivoting ball support top extension hole coincides with the frame top extension hole, when the pivoting ball support face is in the first position such that a pin may be simultaneously positioned within the pivoting ball support extension hole and the frame top extension hole.

According to a further embodiment, the pivoting ball support movement prevention means comprises: the frame, the frame further having a slot; the pivoting ball support, the pivoting ball support further having a top extension, the pivoting ball support top extension having a hole; and a pin, the pin being shaped to be closely received by the pivoting ball support top extension hole, the pivoting ball support top extension being configured such that the pivoting ball support top extension extends through the frame slot, the amount of such extension being limited such that the pin will be against the frame, when the pivoting ball support face is in its first position and the pin is inserted in the pivoting ball support top extension hole.

According to a further embodiment, the apparatus further comprises pin connecting means, such that the pin remains connected to the apparatus when the pin is removed from the pivoting ball support top extension hole.

According to a further embodiment, the apparatus further comprises: the pin, the pin further having a first end and a second end; and a pin ring, the pin ring being rotatably attached to the pin first end, such that when rotated the pin ring snugly encompasses the pin second end.

According to a further embodiment, the pivoting ball support movement prevention means comprises: the frame, the frame further having a slot and a top extension, the frame top extension having a hole; the pivoting ball support, the pivoting ball support further having a top extension, the pivoting ball support top extension having a hole; and a pin, the pin being shaped to be closely received by the frame top extension hole and the pivoting ball support top extension hole, the pivoting ball support top extension being configured such that the pivoting ball support top extension extends through the frame slot, the frame top extension being positioned on the frame such that the pivoting ball support top extension hole coincides with the frame top extension hole, when the pivoting ball support face is in the first position.

According to a further embodiment, the pivoting ball support movement prevention means comprises: the frame, the frame further having a slot; the pivoting ball support, the pivoting ball support further having a top extension, the pivoting ball support top extension being configured such that the pivoting ball support top extension extends through the frame slot; and a slot plug, the slot plug being pivotally attached to the frame, the slot plug being sized and shaped such that when pivoted the slot plug nestles in, and is closely received by, the frame slot, such that the pivoting ball support is prevented from moving from its first position.

According to a further embodiment, the pivoting ball support forced rotation means comprises a handle, the handle being attached to the pivoting ball support such that movement of the handle causes rotation of the pivoting ball support about the pivoting ball support pivot point.

According to a further embodiment, the apparatus further comprises: the frame, the frame further having a slot; the pivoting ball support, the pivoting ball support further having a top extension extending through the frame slot; and the handle, the handle being attached to the pivoting ball support top extension.

According to a further embodiment, the apparatus further comprises a frame exterior lip, the frame exterior lip being attached to the frame proximate the frame downwardly facing opening, the frame exterior lip further extending radially from the frame downwardly facing opening, the frame exterior lip being tapered downwardly as it extends.

According to a further embodiment the pivoting ball support rotates with respect to the pivoting ball support pivot point, the pivoting ball support pivot point being fixed with respect to the frame.

According to one embodiment, there is provided an apparatus for receiving and securing a hitch ball, comprising: a frame, the frame having an interior, the frame interior having a front section and a rear section, the frame front interior section being shaped and sized for closely receiving portions of a generally round hitch ball, the frame further having a downwardly facing opening, the frame opening being shaped and positioned to allow hitch ball passage into the frame front interior section; a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the hitch ball positioned in the frame front interior section, the pivoting ball support further having a face, the pivoting ball support face being movable from a first position to a second position, the pivoting ball support face first position being such that the pivoting ball support face is at least partially beneath a portion of the hitch ball when the hitch ball is within the frame front interior section, the frame front interior section being sized and shaped such that the pivoting ball support face prevents the hitch ball from passing through the frame opening, the pivoting ball support pivot point and the pivoting ball support face being further configured with respect to the frame front interior section, such that the force exerted by the hitch ball on the pivoting ball support face tends to rotate the pivoting ball support face about the pivoting ball support pivot point in a manner such that the pivoting ball support face stays in, or is moved toward, the first position; and a rotation member, the rotation member being attached to the pivoting ball support such that movement of the rotation member causes rotation of the pivoting ball support about the pivoting ball support pivot point.

According to a further embodiment the apparatus further comprises a frame exterior lip, the frame exterior lip being attached to the frame proximate the frame downwardly facing opening, the frame exterior lip further extending radially from the frame downwardly facing opening, the frame exterior lip being tapered downwardly as it extends.

According to a further embodiment, the pivoting ball support movement prevention means comprises: the frame, the frame further having a hole; and the pivoting ball support, the pivoting ball support further having a hole, the pivoting ball support hole and the frame hole being aligned when the pivoting ball support is in the first position, the pivoting ball support hole and the frame hole being sized to closely receive a pin.

According to a further embodiment, the pivoting ball support hole further comprises a plurality of holes.

According to a further embodiment, the pivoting ball support movement prevention means comprises: the frame, the frame further having a hole; the pivoting ball support, the pivoting ball support further having a hole; and a pin, the pin being shaped to be closely received by the pivoting ball support hole and the frame hole.

According to a further embodiment, the pivoting ball support rotates with respect to the pivoting ball support pivot point, the pivoting ball support pivot point being fixed with respect to the frame.

According to one embodiment, there is provided an apparatus for receiving and securing a hitch ball, comprising: a frame, the frame having an interior, the frame interior having a front section and a rear section, the frame front interior section being shaped and sized for closely receiving portions of a generally round hitch ball, the frame further having a downwardly facing opening, the frame opening being shaped and positioned to allow hitch ball passage into the frame front interior section; a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the hitch ball positioned in the frame front interior section, the pivoting ball support further having a face, the pivoting ball support face being movable from a first position to a second position, the pivoting ball support face first position being such that the pivoting ball support face is at least partially beneath a portion of the hitch ball when the hitch ball is within the frame front interior section, the frame front interior section being sized and shaped such that the pivoting ball support face prevents the hitch ball from passing through the frame opening; a spring, the spring having a first and second end, the spring's first end being positioned against the pivoting ball support, the spring's second end being positioned against the frame rear interior section interior surface, such that movement of the pivoting ball support face from its first position to its second position is resisted; and a rotation member, the rotation member being attached to the pivoting ball support such that movement of the rotation member causes rotation of the pivoting ball support about the pivoting ball support pivot point.

According to a further embodiment, a plurality of springs is so positioned.

According to a further embodiment the apparatus of further comprises a frame exterior lip, the frame exterior lip being attached to the frame proximate the frame downwardly facing opening, the frame exterior lip further extending radially from the frame downwardly facing opening, the frame exterior lip being tapered downwardly as it extends.

According to one embodiment, there is provided an apparatus for receiving and securing a hitch ball, comprising: a frame, the frame having an interior, the frame interior having a front section and a rear section, the frame front interior section being shaped and sized for closely receiving portions of a generally round hitch ball, the frame further having a downwardly facing opening, the frame opening being shaped and positioned to allow hitch ball passage into the frame front interior section, the frame further having a slot; a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the hitch ball positioned in the frame front interior section, the pivoting ball support further having a face, the pivoting ball support face being movable from a first position to a second position, the pivoting ball support face first position being such that the pivoting ball support face is at least partially beneath a portion of the hitch ball when the hitch ball is within the frame front interior section, the frame front interior section being sized and shaped such that the pivoting ball support face prevents the hitch ball from passing through the frame opening, and the pivoting ball support further having a top extension, the pivoting ball support top extension having a hole, the pivoting ball support top extension being configured such that the pivoting ball support top extension extends through the frame slot, the amount of such extension being limited such that a pin of substantially the same diameter as the pivoting ball support top extension hole, will be against the frame when the pivoting ball support face is in its first position and the pin is inserted in the pivoting ball support top extension hole; and a rotation member for rotating the pivoting ball support about the pivoting ball support pivot point.

According to a further embodiment, the rotation member comprises the pivoting ball support top extension, the pivoting ball support top extension having a first end positioned for pushing by hand.

According to a further embodiment, the rotation member comprises a handle, the handle being attached to the pivoting ball support such that movement of the handle causes rotation of the pivoting ball support about the pivoting ball support pivot point.

According to a further embodiment, the pivoting ball support rotates with respect to the pivoting ball support pivot point, the pivoting ball support pivot point being fixed with respect to the frame.

According to a further embodiment, the apparatus further comprises: the frame, the frame further having a slot; the pivoting ball support, the pivoting ball support further having a top extension extending through the frame slot; and the handle, the handle being attached to the pivoting ball support top extension.

According to a further embodiment the apparatus of further comprises a frame exterior lip, the frame exterior lip being attached to the frame proximate the frame downwardly facing opening, the frame exterior lip further extending radially from the frame downwardly facing opening, the frame exterior lip being tapered downwardly as it extends.

According to one embodiment, there is provided an apparatus for receiving and securing a hitch ball, comprising: a frame, the frame having an interior, the frame interior having a front section and a rear section, the frame front interior section being shaped and sized for closely receiving portions of a generally round hitch ball, the frame further having a downwardly facing opening, the frame opening being shaped and positioned to allow hitch ball passage into the frame front interior section, the frame further having a slot and a top extension, the frame top extension having a hole; a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the hitch ball positioned in the frame front interior section, the pivoting ball support further having a face, the pivoting ball support face being movable from a first position to a second position, the pivoting ball support face first position being such that the pivoting ball support face is at least partially beneath a portion of the hitch ball when the hitch ball is within the frame front interior section, the frame front interior section being sized and shaped such that the pivoting ball support face prevents the hitch ball from passing through the frame opening, the pivoting ball support further having a top extension, the pivoting ball support top extension having a hole, the pivoting ball support top extension being configured such that the pivoting ball support top extension extends through the frame slot, the frame top extension being positioned on the frame such that the pivoting ball support top extension hole coincides with the frame top extension hole, when the pivoting ball support face is in the first position; and a rotation member for rotating the pivoting ball support about the pivoting ball support pivot point.

According to a further embodiment, the rotation member comprises the pivoting ball support top extension, the pivoting ball support top extension having a first end positioned for pushing by hand.

According to a further embodiment, the rotation member comprises a handle, the handle being attached to the pivoting ball support such that movement of the handle causes rotation of the pivoting ball support about the pivoting ball support pivot point.

According to a further embodiment, the rotation member is attached to the pivoting ball support top extension.

According to a further embodiment the apparatus of further comprises a frame exterior lip, the frame exterior lip being attached to the frame proximate the frame downwardly facing opening, the frame exterior lip further extending radially from the frame downwardly facing opening, the frame exterior lip being tapered downwardly as it extends.

According to one embodiment, there is provided an apparatus for receiving and securing a hitch ball, comprising: a frame, the frame having an interior, the frame interior having a front section and a rear section, the frame front interior section being shaped and sized for closely receiving portions of a generally round hitch ball, the frame further having a downwardly facing opening, the frame opening being shaped and positioned to allow hitch ball passage into the frame front interior section, the frame further having a slot; a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the hitch ball positioned in the frame front interior section, the pivoting ball support further having a face, the pivoting ball support face being movable from a first position to a second position, the pivoting ball support face first position being such that the pivoting ball support face is at least partially beneath a portion of the hitch ball when the hitch ball is within the frame front interior section, the frame front interior section being sized and shaped such that the pivoting ball support face prevents the hitch ball from passing through the frame opening, the pivoting ball support further having a top extension, the pivoting ball support top extension having a hole; a pin, the pin being shaped to be closely received by the pivoting ball support top extension hole, the pivoting ball support top extension being configured such that the pivoting ball support top extension extends through the frame slot, the amount of such extension being limited such that the pin will be against the frame, when the pivoting ball support face is in its first position and the pin is inserted in the pivoting ball support top extension hole; and a rotation member for rotating the pivoting ball support about the pivoting ball support pivot point.

According to a further embodiment, the apparatus further comprises: the pin, the pin further having a first end and a second end; and a pin ring, the pin ring being rotatably attached to the pin first end, such that when rotated the pin ring snugly encompasses the pin second end.

According to a further embodiment, the rotation member comprises the pivoting ball support top extension, the pivoting ball support top extension having a first end positioned for pushing by hand.

According to a further embodiment, the rotation member comprises a handle, the handle being attached to the pivoting ball support such that movement of the handle causes rotation of the pivoting ball support about the pivoting ball support pivot point.

According to a further embodiment, the rotation member is attached to the pivoting ball support top extension.

According to a further embodiment the apparatus of further comprises a frame exterior lip, the frame exterior lip being attached to the frame proximate the frame downwardly facing opening, the frame exterior lip further extending radially from the frame downwardly facing opening, the frame exterior lip being tapered downwardly as it extends.

According to one embodiment, there is provided an apparatus for receiving and securing a hitch ball, comprising: a frame, the frame having an interior, the frame interior having a front section and a rear section, the frame front interior section being shaped and sized for closely receiving portions of a generally round hitch ball, the frame further having a downwardly facing opening, the frame opening being shaped and positioned to allow hitch ball passage into the frame front interior section, the frame further having a slot and a top extension, the frame top extension having a hole; a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the hitch ball positioned in the frame front interior section, the pivoting ball support further having a face, the pivoting ball support face being movable from a first position to a second position, the pivoting ball support face first position being such that the pivoting ball support face is at least partially beneath a portion of the hitch ball when the hitch ball is within the frame front interior section, the frame front interior section being sized and shaped such that the pivoting ball support face prevents the hitch ball from passing through the frame opening, the pivoting ball support further having a top extension, the pivoting ball support top extension having a hole; a pin, the pin being shaped to be closely received by the frame top extension hole and the pivoting ball support top extension hole, the pivoting ball support top extension being configured such that the pivoting ball support top extension extends through the frame slot, the frame top extension being positioned on the frame such that the pivoting ball support top extension hole coincides with the frame top extension hole, when the pivoting ball support face is in the first position; and a rotation member for rotating the pivoting ball support about the pivoting ball support pivot point.

According to a further embodiment, the rotation member comprises the pivoting ball support top extension, the pivoting ball support top extension having a first end positioned for pushing by hand.

According to a further embodiment, the rotation member comprises a handle, the handle being attached to the pivoting ball support such that movement of the handle causes rotation of the pivoting ball support about the pivoting ball support pivot point.

According to a further embodiment, the rotation member is attached to the pivoting ball support top extension.

According to a further embodiment the apparatus of further comprises a frame exterior lip, the frame exterior lip being attached to the frame proximate the frame downwardly facing opening, the frame exterior lip further extending radially from the frame downwardly facing opening, the frame exterior lip being tapered downwardly as it extends.

According to one embodiment, there is provided an apparatus for receiving and securing a hitch ball, comprising: a frame, the frame having an interior, the frame interior having a front section and a rear section, the frame front interior section being shaped and sized for closely receiving portions of a generally round hitch ball, the frame further having a downwardly facing opening, the frame opening being shaped and positioned to allow hitch ball passage into the frame front interior section, the frame further having a slot; a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the hitch ball positioned in the frame front interior section, the pivoting ball support further having a face, the pivoting ball support face being movable from a first position to a second position, the pivoting ball support face first position being such that the pivoting ball support face is at least partially beneath a portion of the hitch ball when the hitch ball is within the frame front interior section, the frame front interior section being sized and shaped such that the pivoting ball support face prevents the hitch ball from passing through the frame opening, the pivoting ball support further having a top extension, the pivoting ball support top extension being configured such that the pivoting ball support top extension extends through the frame slot; a slot plug, the slot plug being pivotally attached to the frame, the slot plug being sized and shaped such that when pivoted the slot plug nestles in, and is closely received by, the frame slot, such that the pivoting ball support is prevented from moving from its first position; and a rotation member for rotating the pivoting ball support about the pivoting ball support pivot point.

According to a further embodiment, the rotation member comprises the pivoting ball support top extension, the pivoting ball support top extension having a first end positioned for pushing by hand.

According to a further embodiment, the rotation member comprises a handle, the handle being attached to the pivoting ball support such that movement of the handle causes rotation of the pivoting ball support about the pivoting ball support pivot point.

According to a further embodiment, the rotation member is attached to the pivoting ball support top extension.

According to a further embodiment the apparatus of further comprises a frame exterior lip, the frame exterior lip being attached to the frame proximate the frame downwardly facing opening, the frame exterior lip further extending radially from the frame downwardly facing opening, the frame exterior lip being tapered downwardly as it extends.

According to one embodiment, there is provided a hitch comprising: a ball; a frame, the frame having an interior, the frame interior having a front section and a rear section, the frame front interior section being shaped and sized for closely receiving portions of the hitch ball, the frame further having a downwardly facing opening, the frame opening being shaped and positioned to allow hitch ball passage into the frame front interior section; a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the hitch ball positioned in the frame front interior section, the pivoting ball support further having a face, the pivoting ball support face being movable from a first position to a second position, the pivoting ball support face first position being such that the pivoting ball support face is at least partially beneath a portion of the hitch ball when the hitch ball is within the frame front interior section, the frame front interior section being sized and shaped such that the pivoting ball support face prevents the hitch ball from passing through the frame opening; pivoting ball support movement resistance means, such that movement of the pivoting ball support face from its first position to its second position is resisted; and pivoting ball support forced rotation means, such that the pivoting ball support face can be manually moved from the first to the second position.

According to one embodiment, there is provided an apparatus for receiving and securing a ball, comprising: a frame, the frame having an interior, the frame interior having a front section and a rear section, the frame front interior section being shaped and sized for closely receiving portions of a generally round ball, the frame further having an opening, the frame opening being shaped and positioned to allow ball passage into the frame front interior section; a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the ball positioned in the frame front interior section, the pivoting ball support further having a face, the pivoting ball support face being movable from a first position to a second position, the pivoting ball support face first position being such that the pivoting ball support face is at least partially beneath a portion of the ball when the ball is within the frame front interior section, the frame front interior section being sized and shaped such that the pivoting ball support face prevents the ball from passing through the frame opening; pivoting ball support movement resistance means, such that movement of the pivoting ball support face from its first position to its second position is resisted; and pivoting ball support forced rotation means, such that the pivoting ball support face can be manually moved from the first to the second position.

According to a further embodiment, the pivoting ball support movement resistance means comprises the pivoting ball support pivot point and the pivoting ball support face, the pivoting ball support pivot point and the pivoting ball support face being configured with respect to the frame front interior section, such that the force exerted by the ball on the pivoting ball support face tends to rotate the pivoting ball support face about the pivoting ball support pivot point in a manner such that the pivoting ball support face stays in, or is moved toward, the first position.

According to a further embodiment, the pivoting ball support movement resistance means further comprises the frame, the frame further having a frame rear interior section interior surface, and a spring, the spring having a first and second end, the spring's first end being positioned against the pivoting ball support, the spring's second end being positioned against the frame rear interior section interior surface.

According to a further embodiment, the apparatus further comprises the frame, the frame further having a lip, the frame lip being shaped and positioned to extend beneath a portion of the ball positioned in the frame front interior section.

According to a further embodiment, the apparatus further comprises the frame, the frame further having a frame front interior section interior surface, the frame front interior section interior surface having a rear part extending between the frame front and rear interior sections, such that, when the fully inserted ball seeks to move in a rearward direction, substantial portions of the rear of the ball will encounter the frame front interior section interior surface rear part.

According to a further embodiment, the apparatus further comprises the frame lip, the frame lip further having a rearmost edge, and the frame front interior section interior surface, the frame front interior section interior surface further having a rearmost edge, the frame lip rearmost edge and the frame front interior section interior surface rearmost edge being sized and shaped such that a fine between such edges, lying on a plane cut through the center of the fully inserted ball, passes through or below the center of the ball.

According to a further embodiment, the apparatus further comprises the frame lip and the frame front interior section interior surface, the frame lip and the frame front interior section interior surface being shaped and sized such that, as the ball is inserted into the frame front interior section, the frame front interior section interior surface urges the ball to a position such that a portion of the ball is above the frame lip when the ball is fully inserted.

According to a further embodiment, the apparatus further comprises the frame, the frame further having a frame front interior section interior surface, the frame lip extending, in a generally arc shaped fashion, on and along the frame front interior section interior surface, approximately 45 degrees on either side of the longitudinal axis of the frame, when measured on a circle having a center coincident with the fully inserted ball's center.

According to a further embodiment, the apparatus further comprises the frame lip, the frame lip further having a frame lip face, the frame lip face being generally concave and sized such that the frame lip face is substantially flush with the fully inserted ball.

According to a further embodiment, the apparatus further comprises the frame, the frame further having a frame front interior section interior surface, the frame front interior section interior surface having a rear part extending downwardly between the frame front and rear interior sections, such that, when the fully inserted ball seeks to move in a rearward direction, substantial portions of the rear of the ball will encounter the frame front interior section interior surface rear part.

According to a further embodiment, the frame front interior section interior surface rear part extends from 15 degrees to 90 degrees along the circumference of a circle having a center coincident with the center of the fully inserted ball.

According to a further embodiment, the pivoting ball support movement resistance means further comprises the frame, the frame further having a frame rear interior section interior surface, and a spring, the spring having a first and second end, the spring's first end being positioned against the pivoting ball support, the spring's second end being positioned against the frame rear interior section interior surface.

According to a further embodiment, the apparatus further comprises the frame, the frame further having a lip, the frame lip being shaped and positioned to extend beneath a portion of the ball positioned in the frame front interior section.

According to a further embodiment, the apparatus further comprises the frame lip, the frame lip further having a rearmost edge, and the frame front interior section interior surface, the frame front interior section interior surface further having a rearmost edge, the frame lip rearmost edge and the frame front interior section interior surface rearmost edge being sized and shaped such that a line between such edges, lying on a plane cut through the center of the fully inserted ball, passes below the center of the ball.

According to a further embodiment, the apparatus further comprises the frame lip and the frame front interior section interior surface, the frame lip and the frame front interior section interior surface being shaped and sized such that, as the ball is inserted into the frame front interior section, the frame front interior section interior surface urges the ball to a position such that a portion of the ball is above the frame lip when the ball is fully inserted.

According to a further embodiment, the apparatus further comprises the pivoting ball support face, the pivoting ball support face being further shaped and sized to closely follow the circumference of the adjacent portions of the ball, in a plane cut through the center of the fully inserted ball.

According to a further embodiment, the pivoting ball support face follows the ball circumference through at least 30 degrees.

According to a further embodiment, the apparatus further comprises the pivoting ball support and the frame opening, the pivoting ball support further having a bottom end and the frame opening further having a rear section corresponding generally with the frame rear interior section, the pivoting ball support being further sized and positioned such that the pivoting ball support bottom end does not extend below the frame opening rear section.

According to a further embodiment, the pivoting ball support movement resistance means comprises: the frame, the frame further having a frame rear interior section interior surface; and a plurality of springs, the springs each having a first and second end, each spring's first end being positioned against the pivoting ball support, each spring's second end being positioned against the frame rear interior section interior surface.

According to a further embodiment, the pivoting ball support forced rotation means comprises a handle, the handle being attached to the pivoting ball support such that movement of the handle causes rotation of the pivoting ball support about the pivoting ball support pivot point.

According to a further embodiment, the pivoting ball support is positioned such that its clockwise rotation about the pivoting ball support pivot point moves the pivoting ball support from its first position to its second position.

According to a further embodiment, the handle is attached to the pivoting ball support above the pivoting ball support pivot point.

According to a further embodiment, the apparatus further comprises the pivoting ball support pivot point, the pivoting ball support pivot point having a first and second end, and two handles, the first handle being attached to the pivoting ball support pivot point first end, the second handle being attached to the pivoting ball support pivot point second end.

According to a further embodiment, the apparatus further comprises the pivoting ball support pivot point, the pivoting ball support pivot point having a first and second end, and the handle, the handle being attached to the pivoting ball support pivot point first end and second end.

According to a further embodiment, the handle is shaped and configured such that it runs in a generally rearward direction along the frame when the pivoting ball support face is in its first position.

According to a further embodiment, the handle is shaped and configured such that it runs in a generally forward direction along the frame when the pivoting ball support face is in its first position.

According to a further embodiment, the handle is shaped and configured such that it runs substantially flush to the frame when the pivoting ball support face is in its first position.

According to a further embodiment, the handle is "T" shaped.

According to a further embodiment, the apparatus further comprises handle gripping means.

According to a further embodiment, the apparatus further comprises a handle hook, the handle hook being attached to the frame, the handle hook being shaped and positioned such that the handle is received and held by the handle hook when the pivoting ball support face is in its first position.

According to a further embodiment, the handle is shaped and configured such that, with respect to the horizontal, it runs at an angle of sufficient magnitude to allow the handle to be readily gripped when the frame is positioned substantially flush to a horizontal surface and the pivoting ball support face is in its first position.

According to a further embodiment, the referenced angle is 10 to 90 degrees from the horizontal.

According to a further embodiment, the apparatus further comprises pivoting ball support movement prevention means, such that movement of the pivoting ball support face from the first position to the second position is prevented.

According to a further embodiment, the apparatus further comprises a frame exterior lip, the frame exterior lip being attached to the frame proximate the frame opening, the frame exterior lip further extending radially from the frame opening, the frame exterior lip being tapered downwardly as it extends.

According to a further embodiment, the apparatus further comprises a pivoting ball support stop, the pivoting ball support stop being attached to the frame interior rear section and positioned such that movement of the pivoting ball support is halted when the pivoting ball support encounters the pivoting ball support stop.

According to a further embodiment, the pivoting ball support rotates with respect to the pivoting ball support pivot point, the pivoting ball support pivot point being fixed with respect to the frame.

According to a further embodiment, the apparatus further comprises a channel structure, the channel structure being attached to the frame and extending rearwardly, the channel structure being shaped to closely receive all or a portion of each of three sides of a rectangular structure.

According to a further embodiment, the apparatus further comprises an A-frame structure, the channel structure being attached to the frame and extending rearwardly, the A-frame structure being shaped to closely receive a V-shaped structure.

According to one embodiment, there is provided an apparatus for receiving and securing a all, comprising: a frame, the frame having an interior, the frame interior having a front section and a rear section, the frame front interior section being shaped and sized for closely receiving portions of a generally round ball, the frame further having an opening, the frame opening being shaped and positioned to allow ball passage into the frame front interior section; a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the ball positioned in the frame front interior section, the pivoting ball support further having a face, the pivoting ball support face being movable from a first position to a second position, the pivoting ball support face first position being such that the pivoting ball support face is at least partially beneath a portion of the ball when the ball is within the frame front interior section, the frame front interior section being sized and shaped such that the pivoting ball support face prevents the ball from passing through the frame opening; pivoting ball support movement prevention means, such that movement of the pivoting ball support face from the first position to the second position is prevented; and pivoting ball support forced rotation means, such that the pivoting ball support face can be manually moved from the first to the second position after disablement of the pivoting ball support movement prevention means.

According to a further embodiment, the pivoting ball support movement prevention means comprises the frame, the frame further having a slot, and the pivoting ball support, the pivoting ball support further having a top extension, the pivoting ball support top extension having a hole, the pivoting ball support top extension being configured such that the pivoting ball support top extension extends through the frame slot, the amount of such extension being limited such that a pin of substantially the same diameter as the pivoting ball support top extension hole, will be against the frame when the pivoting ball support face is in its first position and the pin is inserted in the pivoting ball support top extension hole.

According to a further embodiment, the pivoting ball support forced rotation means comprises the frame, the frame further having a slot, and the pivoting ball support, the pivoting ball support having a top extension, the pivoting ball support top extension being configured such that the pivoting ball support top extension extends through the frame slot.

According to a further embodiment, the pivoting ball support movement prevention means comprises: the frame, the frame further having a slot and a top extension, the frame top extension having a hole; and the pivoting ball support, the pivoting ball support further having a top extension, the pivoting ball support top extension having a hole, the pivoting ball support top extension being configured such that the pivoting ball support top extension extends through the frame slot, the frame top extension being positioned on the frame such that the pivoting ball support top extension hole coincides with the frame top extension hole, when the pivoting ball support face is in the first position such that a pin may be simultaneously positioned within the pivoting ball support extension hole and the frame top extension hole.

According to a further embodiment, the pivoting ball support movement prevention means comprises: the frame, the frame further having a slot; the pivoting ball support, the pivoting ball support further having a top extension, the pivoting ball support top extension having a hole; and a pin, the pin being shaped to be closely received by the pivoting ball support top extension hole, the pivoting ball support top extension being configured such that the pivoting ball support top extension extends through the frame slot, the amount of such extension being limited such that the pin will be against the frame, when the pivoting ball support face is in its first position and the pin is inserted in the pivoting ball support top extension hole.

According to a further embodiment, the apparatus further comprises pin connecting means, such that the pin remains connected to the apparatus when the pin is removed from the pivoting ball support top extension hole.

According to a further embodiment, the apparatus further comprises: the pin, the pin further having a first end and a second end; and a pin ring, the pin ring being rotatably attached to the pin first end, such that when rotated the pin ring snugly encompasses the pin second end.

According to a further embodiment, the pivoting ball support movement prevention means comprises: the frame, the frame further having a slot and a top extension, the frame top extension having a hole; the pivoting ball support, the pivoting ball support further having a top extension, the pivoting ball support top extension having a hole; and a pin, the pin being shaped to be closely received by the frame top extension hole and the pivoting ball support top extension hole, the pivoting ball support top extension being configured such that the pivoting ball support top extension extends through the frame slot, the frame top extension being positioned on the frame such that the pivoting ball support top extension hole coincides with the frame top extension hole, when the pivoting ball support face is in the first position.

According to a further embodiment, the pivoting ball support movement prevention means comprises: the frame, the frame further having a slot; the pivoting ball support, the pivoting ball support further having a top extension, the pivoting ball support top extension being configured such that the pivoting ball support top extension extends through the frame slot; and a slot plug, the slot plug being pivotally attached to the frame, the slot plug being sized and shaped such that when pivoted the slot plug nestles in, and is closely received by, the frame slot, such that the pivoting ball support is prevented from moving from its first position.

According to a further embodiment, the pivoting ball support forced rotation means comprises a handle, the handle being attached to the pivoting ball support such that movement of the handle causes rotation of the pivoting ball support about the pivoting ball support pivot point.

According to a further embodiment, the apparatus further comprises: the frame, the frame further having a slot; the pivoting ball support, the pivoting ball support further having a top extension extending through the frame slot; and the handle, the handle being attached to the pivoting ball support top extension.

According to a further embodiment, the apparatus further comprises a frame exterior lip, the frame exterior lip being attached to the frame proximate the frame opening, the frame exterior lip further extending radially from the frame opening, the frame exterior lip being tapered downwardly as it extends.

According to a further embodiment the pivoting ball support rotates with respect to the pivoting ball support pivot point, the pivoting ball support pivot point being fixed with respect to the frame.

According to one embodiment, there is provided an apparatus for receiving and securing a ball, comprising: a frame, the frame having an interior, the frame interior having a front section and a rear section, the frame front interior section being shaped and sized for closely receiving portions of a generally round ball, the frame further having an opening, the frame opening being shaped and positioned to allow ball passage into the frame front interior section; a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the ball positioned in the frame front interior section, the pivoting ball support further having a face, the pivoting ball support face being movable from a first position to a second position, the pivoting ball support face first position being such that the pivoting ball support face is at least partially beneath a portion of the ball when the ball is within the frame front interior section, the frame front interior section being sized and shaped such that the pivoting ball support face prevents the ball from passing through the frame opening, the pivoting ball support pivot point and the pivoting ball support face being further configured with respect to the frame front interior section, such that the force exerted by the ball on the pivoting ball support face tends to rotate the pivoting ball support face about the pivoting ball support pivot point in a manner such that the pivoting ball support face stays in, or is moved toward, the first position; and a rotation member, the rotation member being attached to the pivoting ball support such that movement of the rotation member causes rotation of the pivoting ball support about the pivoting ball support pivot point.

According to a further embodiment the apparatus further comprises a frame exterior lip, the frame exterior lip being attached to the frame proximate the frame opening, the frame exterior lip further extending radially from the frame opening, the frame exterior lip being tapered downwardly as it extends.

According to a further embodiment, the pivoting ball support movement prevention means comprises: the frame, the frame further having a hole; and the pivoting ball support, the pivoting ball support further having a hole, the pivoting ball support hole and the frame hole being aligned when the pivoting ball support is in the first position, the pivoting ball support hole and the frame hole being sized to closely receive a pin.

According to a further embodiment, the pivoting ball support hole further comprises a plurality of holes.

According to a further embodiment, the pivoting ball support movement prevention means comprises: the frame, the frame further having a hole; the pivoting ball support, the pivoting ball support further having a hole; and a pin, the pin being shaped to be closely received by the pivoting ball support hole and the frame hole.

According to a further embodiment, the pivoting ball support rotates with respect to the pivoting ball support pivot point, the pivoting ball support pivot point being fixed with respect to the frame.

According to one embodiment, there is provided an apparatus for receiving and securing a ball, comprising: a frame, the frame having an interior, the frame interior having a front section and a rear section, the frame front interior section being shaped and sized for closely receiving portions of a generally round ball, the frame further having an opening, the frame opening being shaped and positioned to allow ball passage into the frame front interior section; a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the ball positioned in the frame front interior section, the pivoting ball support further having a face, the pivoting ball support face being movable from a first position to a second position, the pivoting ball support face first position being such that the pivoting ball support face is at least partially beneath a portion of the ball when the ball is within the frame front interior section, the frame front interior section being sized and shaped such that the pivoting ball support face prevents the ball from passing through the frame opening; a spring, the spring having a first and second end, the spring's first end being positioned against the pivoting ball support, the spring's second end being positioned against the frame rear interior section interior surface, such that movement of the pivoting ball support face from its first position to its second position is resisted; and a rotation member, the rotation member being attached to the pivoting ball support such that movement of the rotation member causes rotation of the pivoting ball support about the pivoting ball support pivot point.

According to a further embodiment, a plurality of springs is so positioned.

According to a further embodiment the apparatus of further comprises a frame exterior lip, the frame exterior lip being attached to the frame proximate the frame opening, the frame exterior lip further extending radially from the frame opening, the frame exterior lip being tapered downwardly as it extends.

According to one embodiment, there is provided an apparatus for receiving and securing a ball, comprising: a frame, the frame having an interior, the frame interior having a front section and a rear section, the frame front interior section being shaped and sized for closely receiving portions of a generally round ball, the frame further having an opening, the frame opening being shaped and positioned to allow ball passage into the frame front interior section, the frame further having a slot; a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the ball positioned in the frame front interior section, the pivoting ball support further having a face, the pivoting ball support face being movable from a first position to a second position, the pivoting ball support face first position being such that the pivoting ball support face is at least partially beneath a portion of the ball when the ball is within the frame front interior section, the frame front interior section being sized and shaped such that the pivoting ball support face prevents the ball from passing through the frame opening, and the pivoting ball support further having a top extension, the pivoting ball support top extension having a hole, the pivoting ball support top extension being configured such that the pivoting ball support top extension extends through the frame slot, the amount of such extension being limited such that a pin of substantially the same diameter as the pivoting ball support top extension hole, will be against the frame when the pivoting ball support face is in its first position and the pin is inserted in the pivoting ball support top extension hole; and a rotation member for rotating the pivoting ball support about the pivoting ball support pivot point.

According to a further embodiment, the rotation member comprises the pivoting ball support top extension, the pivoting ball support top extension having a first end positioned for pushing by hand.

According to a further embodiment, the rotation member comprises a handle, the handle being attached to the pivoting ball support such that movement of the handle causes rotation of the pivoting ball support about the pivoting ball support pivot point.

According to a further embodiment, the pivoting ball support rotates with respect to the pivoting ball support pivot point, the pivoting ball support pivot point being fixed with respect to the frame.

According to a further embodiment, the apparatus further comprises: the frame, the frame further having a slot; the pivoting ball support, the pivoting ball support further having a top extension extending through the frame slot; and the handle, the handle being attached to the pivoting ball support top extension.

According to a further embodiment the apparatus of further comprises a frame exterior lip, the frame exterior lip being attached to the frame proximate the frame opening, the frame exterior lip further extending radially from the frame opening, the frame exterior lip being tapered downwardly as it extends.

According to one embodiment, there is provided an apparatus for receiving and securing a ball, comprising: a frame, the frame having an interior, the frame interior having a front section and a rear section, the frame front interior section being shaped and sized for closely receiving portions of a generally round ball, the frame further having an opening, the frame opening being shaped and positioned to allow ball passage into the frame front interior section, the frame further having a slot and a top extension, the frame top extension having a hole; a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the ball positioned in the frame front interior section, the pivoting ball support further having a face, the pivoting ball support face being movable from a first position to a second position, the pivoting ball support face first position being such that the pivoting ball support face is at least partially beneath a portion of the ball when the ball is within the frame front interior section, the frame front interior section being sized and shaped such that the pivoting ball support face prevents the ball from passing through the frame opening, the pivoting ball support further having a top extension, the pivoting ball support top extension having a hole, the pivoting ball support top extension being configured such that the pivoting ball support top extension extends through the frame slot, the frame top extension being positioned on the frame such that the pivoting ball support top extension hole coincides with the frame top extension hole, when the pivoting ball support face is in the first position; and a rotation member for rotating the pivoting ball support about the pivoting ball support pivot point.

According to a further embodiment, the rotation member comprises the pivoting ball support top extension, the pivoting ball support top extension having a first end positioned for pushing by hand.

According to a further embodiment, the rotation member comprises a handle, the handle being attached to the pivoting ball support such that movement of the handle causes rotation of the pivoting ball support about the pivoting ball support pivot point.

According to a further embodiment, the rotation member is attached to the pivoting ball support top extension.

According to a further embodiment the apparatus of further comprises a frame exterior lip, the frame exterior lip being attached to the frame proximate the frame opening, the frame exterior lip further extending radially from the frame opening, the frame exterior lip being tapered downwardly as it extends.

According to one embodiment, there is provided an apparatus for receiving and securing a ball, comprising: a frame, the frame having an interior, the frame interior having a front section and a rear section, the frame front interior section being shaped and sized for closely receiving portions of a generally round ball, the frame further having an opening, the frame opening being shaped and positioned to allow ball passage into the frame front interior section, the frame further having a slot; a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the ball positioned in the frame front interior section, the pivoting ball support further having a face, the pivoting ball support face being movable from a first position to a second position, the pivoting ball support face first position being such that the pivoting ball support face is at least partially beneath a portion of the ball when the ball is within the frame front interior section, the frame front interior section being sized and shaped such that the pivoting ball support face prevents the ball from passing through the frame opening, the pivoting ball support further having a top extension, the pivoting ball support top extension having a hole; a pin, the pin being shaped to be closely received by the pivoting ball support top extension hole, the pivoting ball support top extension being configured such that the pivoting ball support top extension extends through the frame slot, the amount of such extension being limited such that the pin will be against the frame, when the pivoting ball support face is in its first position and the pin is inserted in the pivoting ball support top extension hole; and a rotation member for rotating the pivoting ball support about the pivoting ball support pivot point.

According to a further embodiment, the apparatus further comprises: the pin, the pin further having a first end and a second end; and a pin ring, the pin ring being rotatably attached to the pin first end, such that when rotated the pin ring snugly encompasses the pin second end.

According to a further embodiment, the rotation member comprises the pivoting ball support top extension, the pivoting ball support top extension having a first end positioned for pushing by hand.

According to a further embodiment, the rotation member comprises a handle, the handle being attached to the pivoting ball support such that movement of the handle causes rotation of the pivoting ball support about the pivoting ball support pivot point.

According to a further embodiment, the rotation member is attached to the pivoting ball support top extension.

According to a further embodiment the apparatus of further comprises a frame exterior lip, the frame exterior lip being attached to the frame proximate the frame opening, the frame exterior lip further extending radially from the frame opening, the frame exterior lip being tapered downwardly as it extends.

According to one embodiment, there is provided an apparatus for receiving and securing a ball, comprising: a frame, the frame having an interior, the frame interior having a front section and a rear section, the frame front interior section being shaped and sized for closely receiving portions of a generally round ball, the frame further having an opening, the frame opening being shaped and positioned to allow ball passage into the frame front interior section, the frame further having a slot and a top extension, the frame top extension having a hole; a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the ball positioned in the frame front interior section, the pivoting ball support further having a face, the pivoting ball support face being movable from a first position to a second position, the pivoting ball support face first position being such that the pivoting ball support face is at least partially beneath a portion of the ball when the ball is within the frame front interior section, the frame front interior section being sized and shaped such that the pivoting ball support face prevents the ball from passing through the frame opening, the pivoting ball support further having a top extension, the pivoting ball support top extension having a hole; a pin, the pin being shaped to be closely received by the frame top extension hole and the pivoting ball support top extension hole, the pivoting ball support top extension being configured such that the pivoting ball support top extension extends through the frame slot, the frame top extension being positioned on the frame such that the pivoting ball support top extension hole coincides with the frame top extension hole, when the pivoting ball support face is in the first position; and a rotation member for rotating the pivoting ball support about the pivoting ball support pivot point.

According to a further embodiment, the rotation member comprises the pivoting ball support top extension, the pivoting ball support top extension having a first end positioned for pushing by hand.

According to a further embodiment, the rotation member comprises a handle, the handle being attached to the pivoting ball support such that movement of the handle causes rotation of the pivoting ball support about the pivoting ball support pivot point.

According to a further embodiment, the rotation member is attached to the pivoting ball support top extension.

According to a further embodiment the apparatus of further comprises a frame exterior lip, the frame exterior lip being attached to the frame proximate the frame opening, the frame exterior lip further extending radially from the frame opening, the frame exterior lip being tapered downwardly as it extends.

According to one embodiment, there is provided an apparatus for receiving and securing a ball, comprising: a frame, the frame having an interior, the frame interior having a front section and a rear section, the frame front interior section being shaped and sized for closely receiving portions of a generally round ball, the frame further having an opening, the frame opening being shaped and positioned to allow ball passage into the frame front interior section, the frame further having a slot; a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the ball positioned in the frame front interior section, the pivoting ball support further having a face, the pivoting ball support face being movable from a first position to a second position, the pivoting ball support face first position being such that the pivoting ball support face is at least partially beneath a portion of the ball when the ball is within the frame front interior section, the frame front interior section being sized and shaped such that the pivoting ball support face prevents the ball from passing through the frame opening, the pivoting ball support further having a top extension, the pivoting ball support top extension being configured such that the pivoting ball support top extension extends through the frame slot; a slot plug, the slot plug being pivotally attached to the frame, the slot plug being sized and shaped such that when pivoted the slot plug nestles in, and is closely received by, the frame slot, such that the pivoting ball support is prevented from moving from its first position; and a rotation member for rotating the pivoting ball support about the pivoting ball support pivot point.

According to a further embodiment, the rotation member comprises the pivoting ball support top extension, the pivoting ball support top extension having a first end positioned for pushing by hand.

According to a further embodiment, the rotation member comprises a handle, the handle being attached to the pivoting ball support such that movement of the handle causes rotation of the pivoting ball support about the pivoting ball support pivot point.

According to a further embodiment, the rotation member is attached to the pivoting ball support top extension.

According to a further embodiment the apparatus of further comprises a frame exterior lip, the frame exterior lip being attached to the frame proximate the frame opening, the frame exterior lip further extending radially from the frame opening, the frame exterior lip being tapered downwardly as it extends.

According to one embodiment, there is provided a coupling device, comprising: a ball; a frame, the frame having an interior, the frame interior having a front section and a rear section, the frame front interior section being shaped and sized for closely receiving portions of the ball, the frame further having an opening, the frame opening being shaped and positioned to allow ball passage into the frame front interior section; a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the ball positioned in the frame front interior section, the pivoting ball support further having a face, the pivoting ball support face being movable from a first position to a second position, the pivoting ball support face first position being such that the pivoting ball support face is at least partially beneath a portion of the ball when the ball is within the frame front interior section, the frame front interior section being sized and shaped such that the pivoting ball support face prevents the ball from passing through the frame opening; pivoting ball support movement resistance means, such that movement of the pivoting ball support face from its first position to its second position is resisted; and pivoting ball support forced rotation means, such that the pivoting ball support face can be manually moved from the first to the second position.

An apparatus for receiving and securing a hitch ball is provided, comprising: a frame, the frame having an interior, the frame interior having a front section and a rear section, the frame front interior section being shaped and sized for closely receiving portions of a generally round hitch ball, the frame further having a downwardly facing opening, the frame opening being shaped and positioned to allow hitch ball passage into the frame front interior section; a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the hitch ball positioned in the frame front interior section, the pivoting ball support further having a face, the pivoting ball support face being movable from a first position to a second position, the pivoting ball support face first position being such that the pivoting ball support face is at least partially beneath a portion of the hitch ball when the hitch ball is within the frame front interior section, the frame front interior section being sized and shaped such that the pivoting ball support face prevents the hitch ball from passing through the frame opening; pivoting ball support movement resistance means, such that movement of the pivoting ball support face from its first position to its second position is resisted; pivoting ball support movement prevention means, such that movement of the pivoting ball support face from its first position to its second position is resisted; and pivoting ball support forced rotation means, such that the pivoting ball support face can be manually moved from the first to the second position.

In another embodiment, the frame further has a slot and the pivoting ball support forced rotation means further comprises an extension member extending from the pivoting ball support through the frame slot, the pivoting ball support extension member having an end portion, the end portion being shaped to form an acute angle with respect to the frame.

In another embodiment, the pivoting ball support further comprises a hollow, the hollow being sized to receive the spring first end, and further wherein the frame rear interior section interior surface further comprises a hollow, the hollow being sized to receive the spring second end.

DESCRIPTION OF THE DRAWINGS

FIG. 13 is a side view of an embodiment of the device shown in FIG. 12, cut along cutting plane 13—13 depicting the latching mechanism in the closed position.

FIG. 14 is an oblique view of an embodiment of the device.

FIG. 26 is a side view of the embodiment shown in FIG. 24, cut along cutting plane 26—26, depicting the latching mechanism in the closed position.

FIG. 27 is a side view of the embodiment shown in FIG. 24, cut along cutting plane 26—26, depicting the latching mechanism in the open position.

FIG. 28 is a side view illustrating spatial relationships between the ball and the pivoting ball support pivot point.

DESCRIPTION OF THE INVENTION

Figure 1:
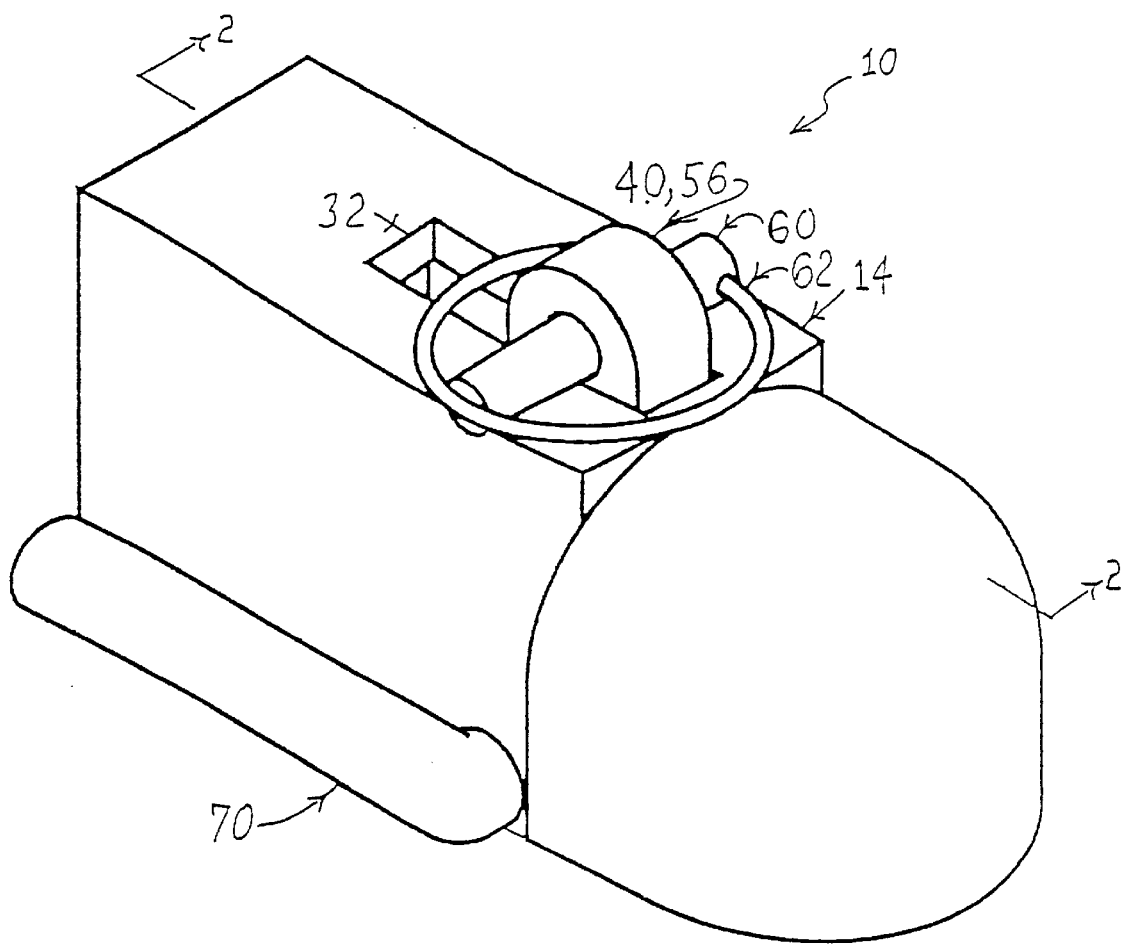
FIG. 1 is an oblique view of an embodiment of the device.
Figure 2:
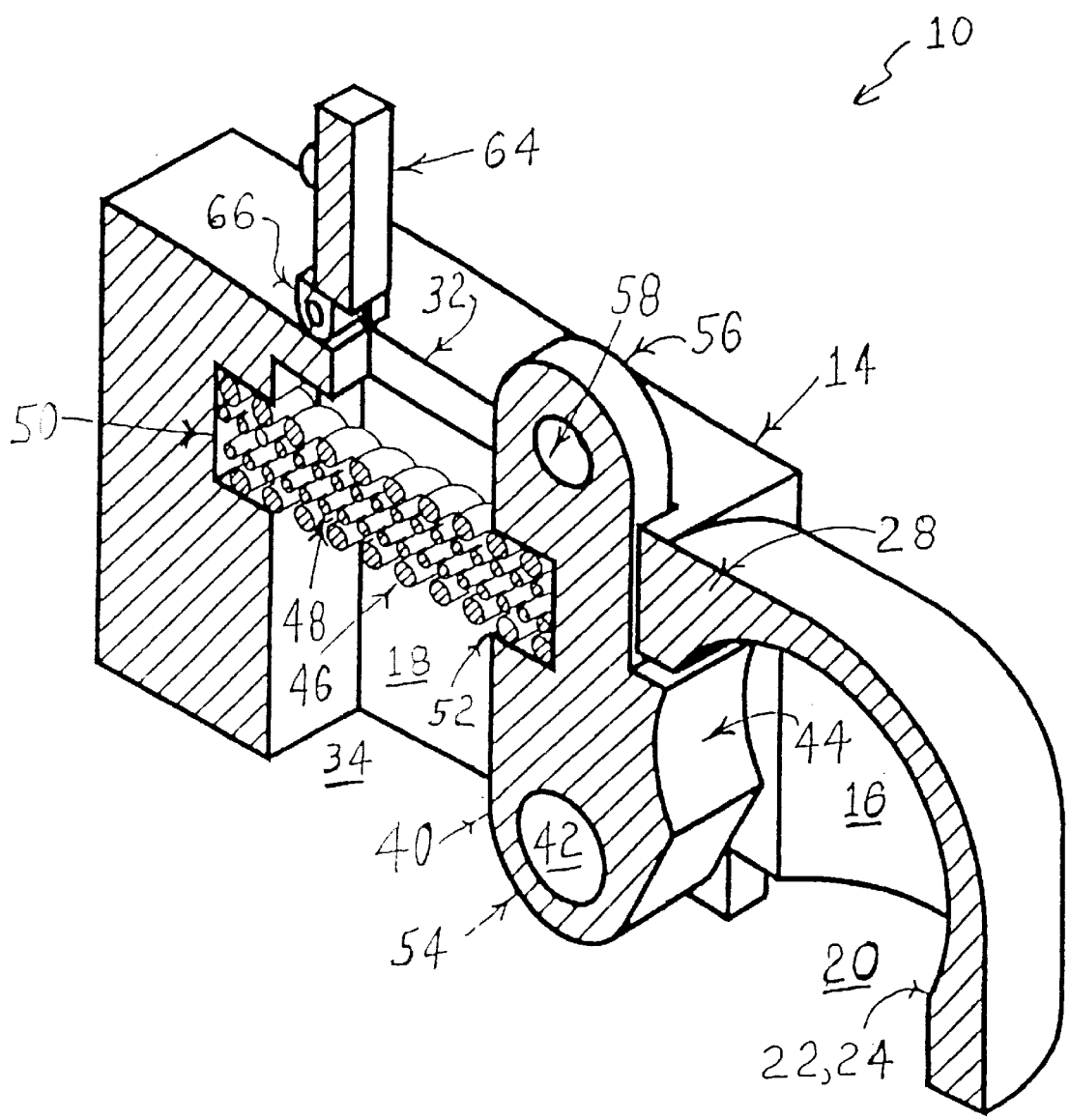
FIG. 2 is an oblique view of an embodiment of the device, cut along cutting plane 2—2.
Figure 3:
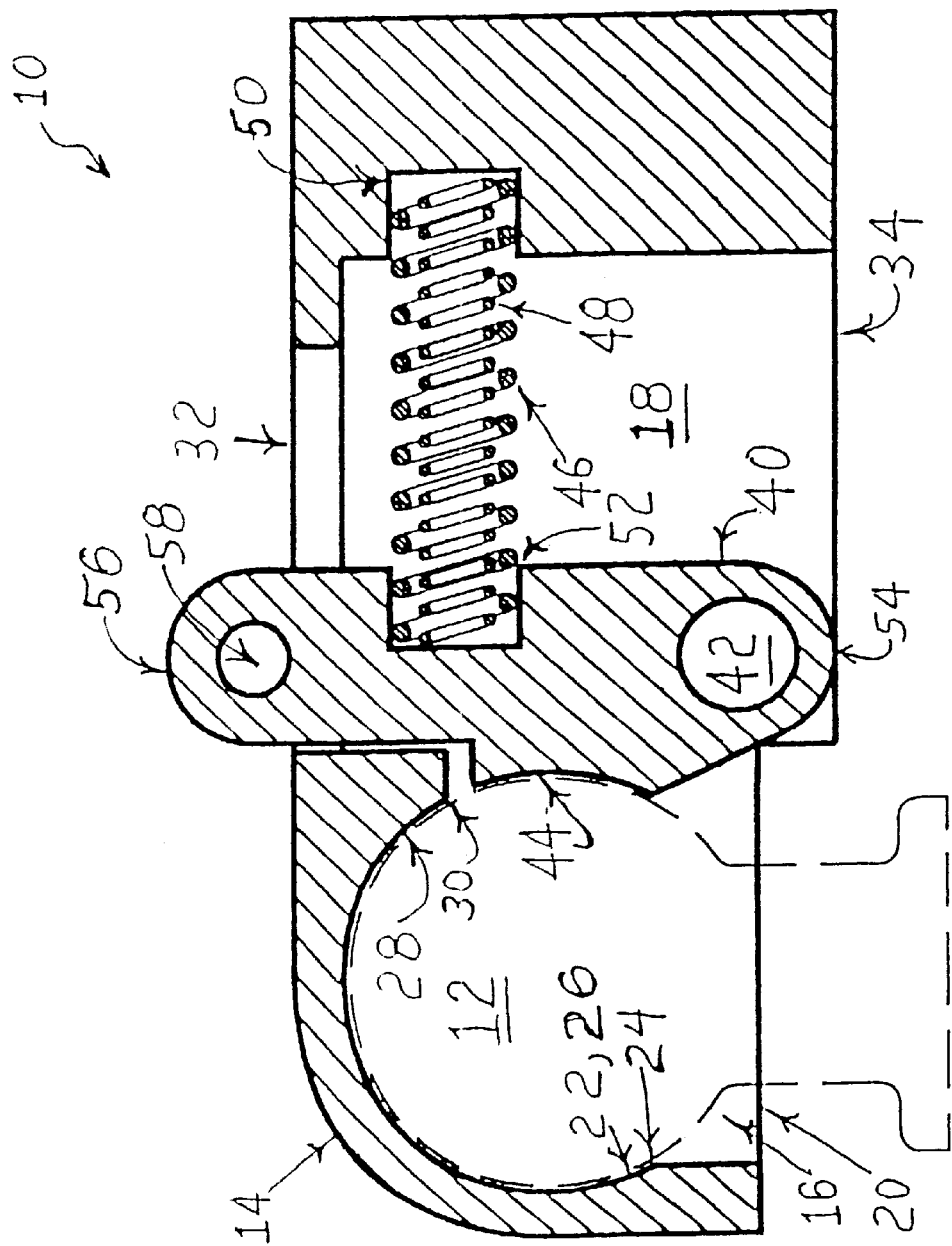
FIG. 3 is a side view of an embodiment of the device, cut along cutting plane 2—2, depicting the latching mechanism in the closed position.
Figure 4:
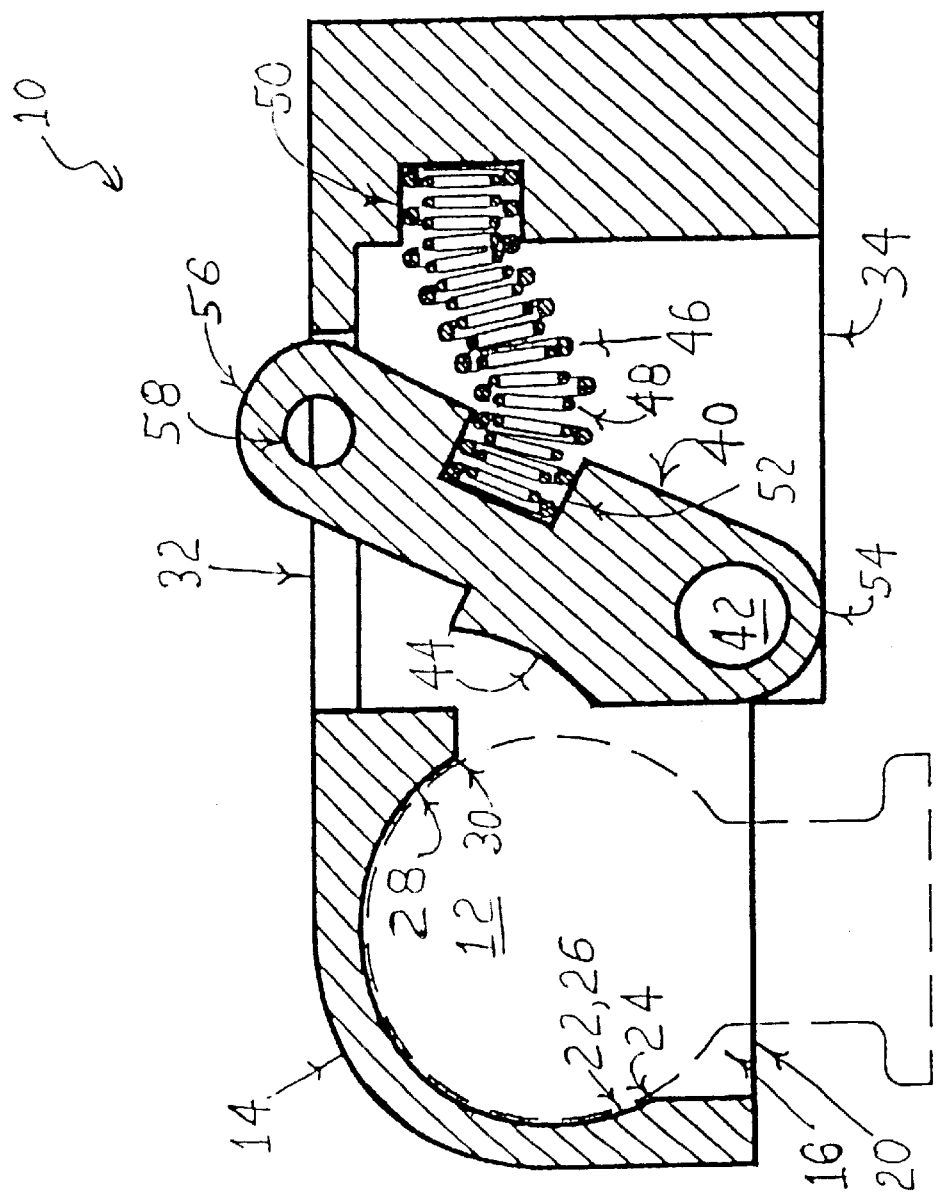
FIG. 4 is a side view of an embodiment of the device cut along cutting plane 2—2, depicting the latching mechanism in the open position.

FIGS. 1–4 depict an embodiment of the device 10, with FIGS. 3–4 showing a typical hitch ball 12. FIGS. 2–4 show the configuration of the frame 14, the frame front section interior 16, the frame rear section interior 18, and the frame opening 20. The frame 14 can be made of a number of materials, including, but not limited to, cast steel, stainless steel, weldable steel, pressed steel, and mild steel. In the embodiment depicted in FIGS. 1–17 and 22–28, cast steel has been chosen for the frame 14. The embodiment depicted in FIGS. 24–27 utilizes pressed steel.

FIGS. 2–4 depict additional frame features such as the frame lip 22, the frame lip rearmost edge 24, the frame lip face 26, the frame front interior section interior surface rear part 28, the frame front interior section interior surface rearmost edge 30, the frame slot 32, and the frame opening rear section 34. The frame lip 22 extends radially around the front portion of the frame front section interior 16, and is generally a continuation of the "dome" which forms the top of the frame front section interior 16. The frame lip face 26 is somewhat concave, allowing a generally flush fit against a fully inserted hitch ball 12. In the embodiment depicted, the frame front interior section interior surface rear part 28, extends approximately 62 degrees from vertical, and generally follows the circumference of the hitch ball 12, as shown in FIGS. 3–4. In the embodiment depicted therein, a line drawn from the frame lip rearmost edge 24 to the frame front interior section interior surface rearmost edge 30 will pass beneath the center of a fully inserted hitch ball 12.

FIG. 1 depicts the position of the frame slot 32 with respect to the pivoting ball support 40. The pivoting ball support 40 rotates with the pivoting ball support pivot point 42 from a first position, in which the pivoting ball support face 44 is in close proximity to the hitch ball 12, to the second position, in which the pivoting ball support face 44 is dislocated, allowing the hitch ball 12 to be removed from the frame front section interior 16 through frame opening 20. The pivoting ball support face 44 first position and second position are depicted in FIG. 3 and FIG. 4, respectively.

In the embodiment shown in FIGS. 1–4, the movement of the pivoting ball support 40 is resisted by a first spring 46 and a second spring 48. The second spring 48 provides a backup means for resisting movement of the pivoting ball support 40 from its first position to its second position. FIGS. 2–4 depict an embodiment in which the ends of both springs are held in place by the first notch 50 and a second notch 52 cut into the frame rear section interior 18 and the pivoting ball support face 44. Other embodiments could easily include springs 46,48 being attached to the frame rear section interior 18 and the pivoting ball support 40, by normal attachment means, including screws, bolts, hooks, or welding. Embodiments are also anticipated that will use only one spring 46, and one or more springs having a rod within the spring 46, with an accompanying hole, for rod movement extending rearwardly into the frame 14 from the frame rear section interior 18.

Although springs 46,48 are substantially horizontal with respect to the frame 14, in the embodiment depicted in FIGS. 2–4, other embodiments are anticipated which would place one or more such springs 46,48 in a non-horizontal position, including embodiments in which the springs 46,48 would have a bend provided, when the pivoting ball support face 44 is in its first position.

FIGS. 2–4 also depict the pivoting ball support bottom end 54, the pivoting ball support top extension 56, and the pivoting ball support top extension hole 58. In the embodiment depicted in FIGS. 1–4, a pin 60, connectable to the frame by a pin cable (not shown), will be against the frame 14 when inserted into pivoting ball support top extension hole 58. Attached to the pin is a pin ring 62 which is sized to fit snugly against the unattached pin 60 end, as shown in FIG. 1.

It is anticipated that the pivoting ball support 40 will also be made of cast steel, although other materials will suffice as described earlier.

In the embodiment depicted in FIGS. 1–4, a handle 70 is provided which provides the means by which the pivoting ball support face 44 is rotated from its first position to its second position, to allow the hitch ball 12 to be removed from the device 10. The handle 70 connects to the pivoting ball support pivot point 42. It is anticipated in other embodiments that several types of handles will be utilized. One or more handles connected to both ends of the pivoting ball support pivot point 42, one or more handles connected to the pivoting ball support top extension 56, handles directed in a forward direction along the frame 14, handles having a "T" shaped cross piece for improved gripping, other grip devices attached to handles, and handles having one or more bends for routing the handle to various desirable locations.

Another anticipated embodiment includes a handle which is elevated from approximately 15 to 50 degrees from the horizontal when the pivoting ball support 40 is in its first position. This embodiment contemplates a sufficient angle from the horizontal to allow the handle to be gripped when the frame 14 is substantially flush to a horizontal object, which would otherwise prevent the handle from being gripped.

It is also anticipated that a handle hook (not shown) will be provided which will receive and secure the end of the handle, as well as other anticipated handles. Handle hooks can be anticipated to include a number of structures including semi-circular extensions from the frame that are positioned where the handle can be moved to rest within the semi-circle, thus having its movement restricted, squeeze clamps in which the handle shaft can be forced between the squeezing edges of such a clamp, a notch in the frame having an elevation at the entry which would prevent lateral movement of the handle without a preceding vertical movement, and other readily available means for securing a shaft in a fixed position.

Figure 5:
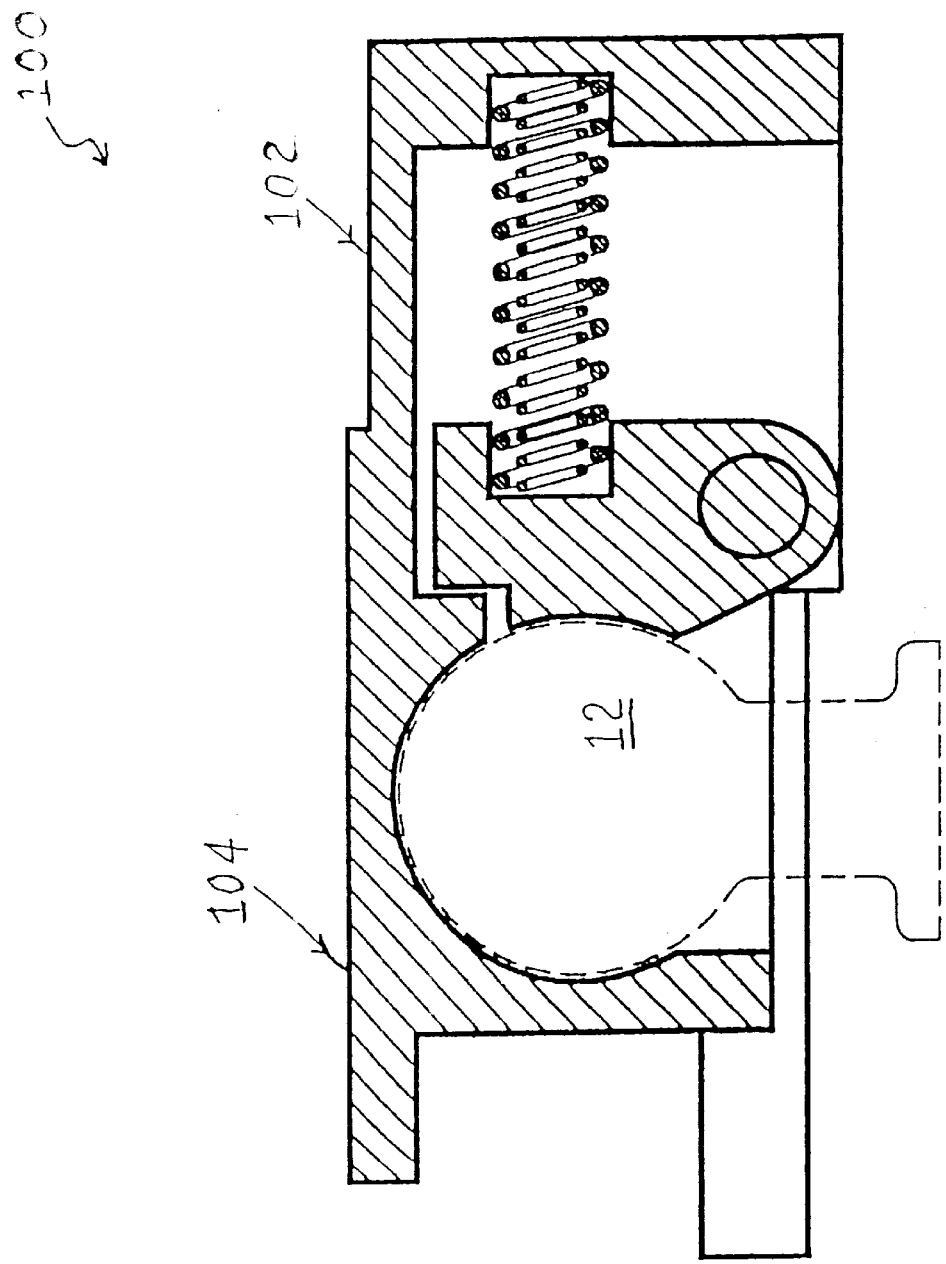
FIG. 5 is a cutaway side view of an embodiment of the device showing a gooseneck adaptation.

FIG. 5 shows a "gooseneck" adaptation 100. In this embodiment the frame 102 has a top 104 connectable to a pipe typically used in gooseneck installations, where the upwardly extending pipe from the device 100 would telescope into another pipe, both pipes having appropriately spaced holes for adjustment of the height of the installed device.

Figure 6:
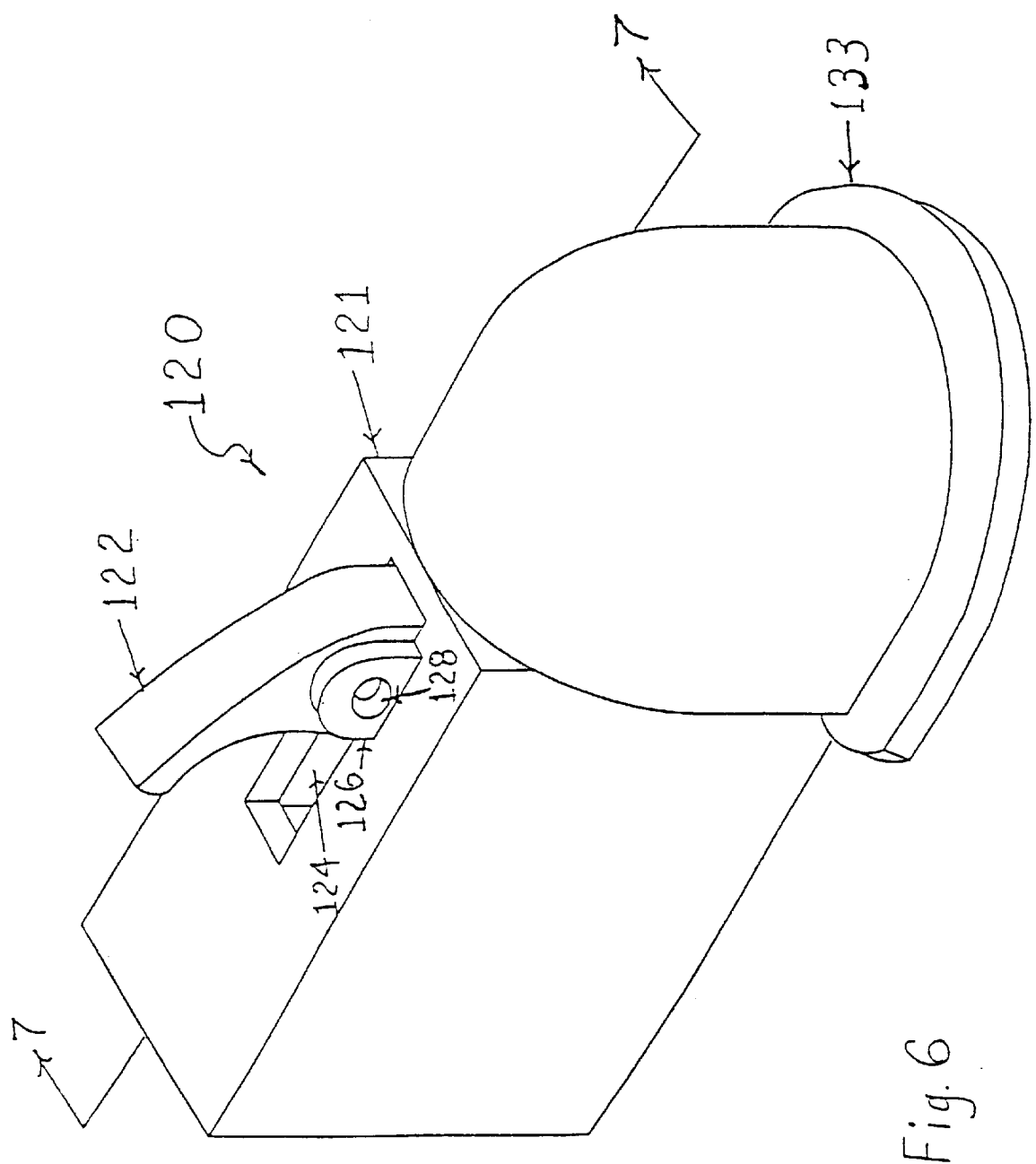
FIG. 6 is an oblique view of an embodiment of the device.
Figure 7:
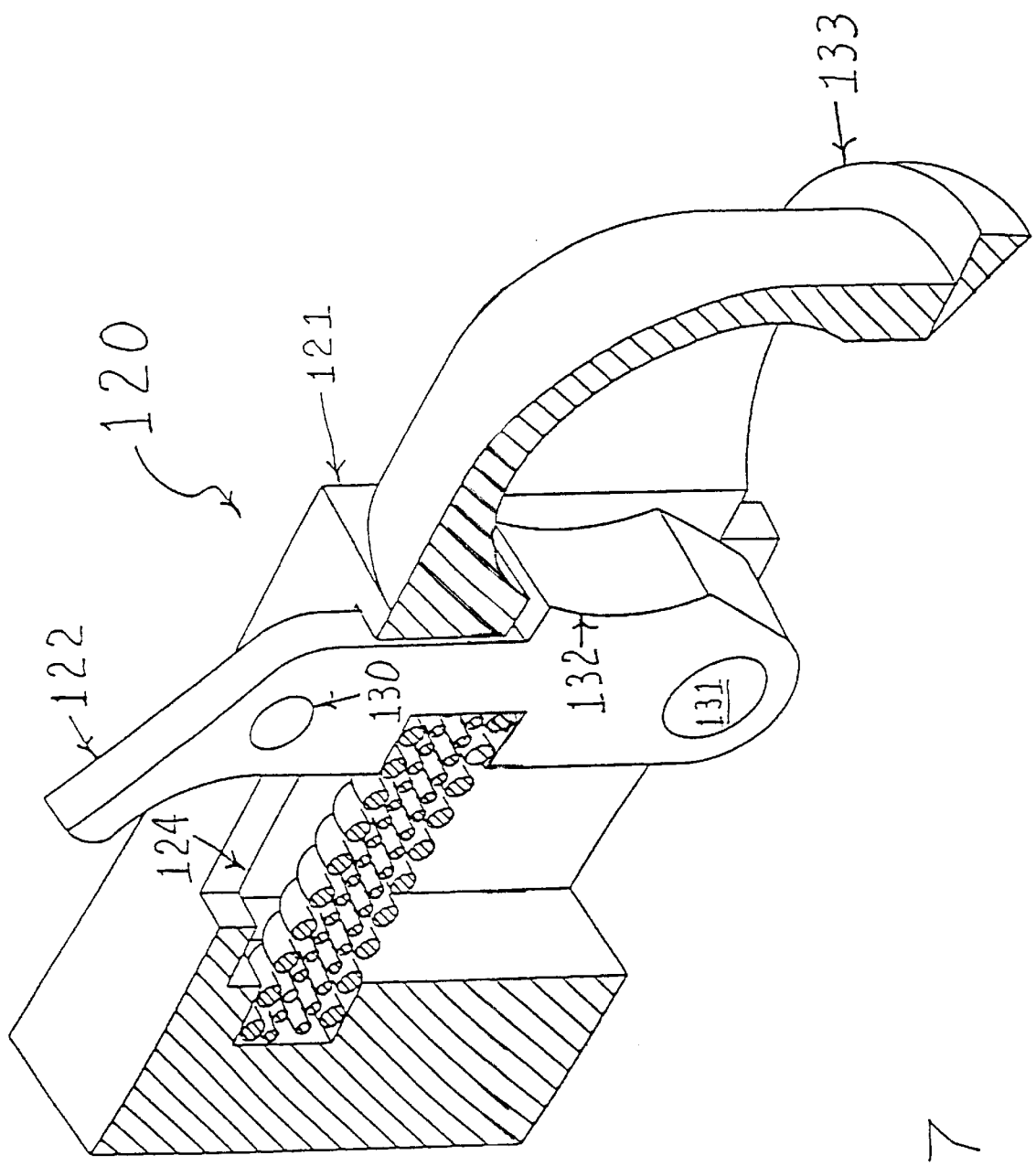
FIG. 7 is an oblique view of an embodiment of the device, cut along cutting plane 7—7.
Figure 8:
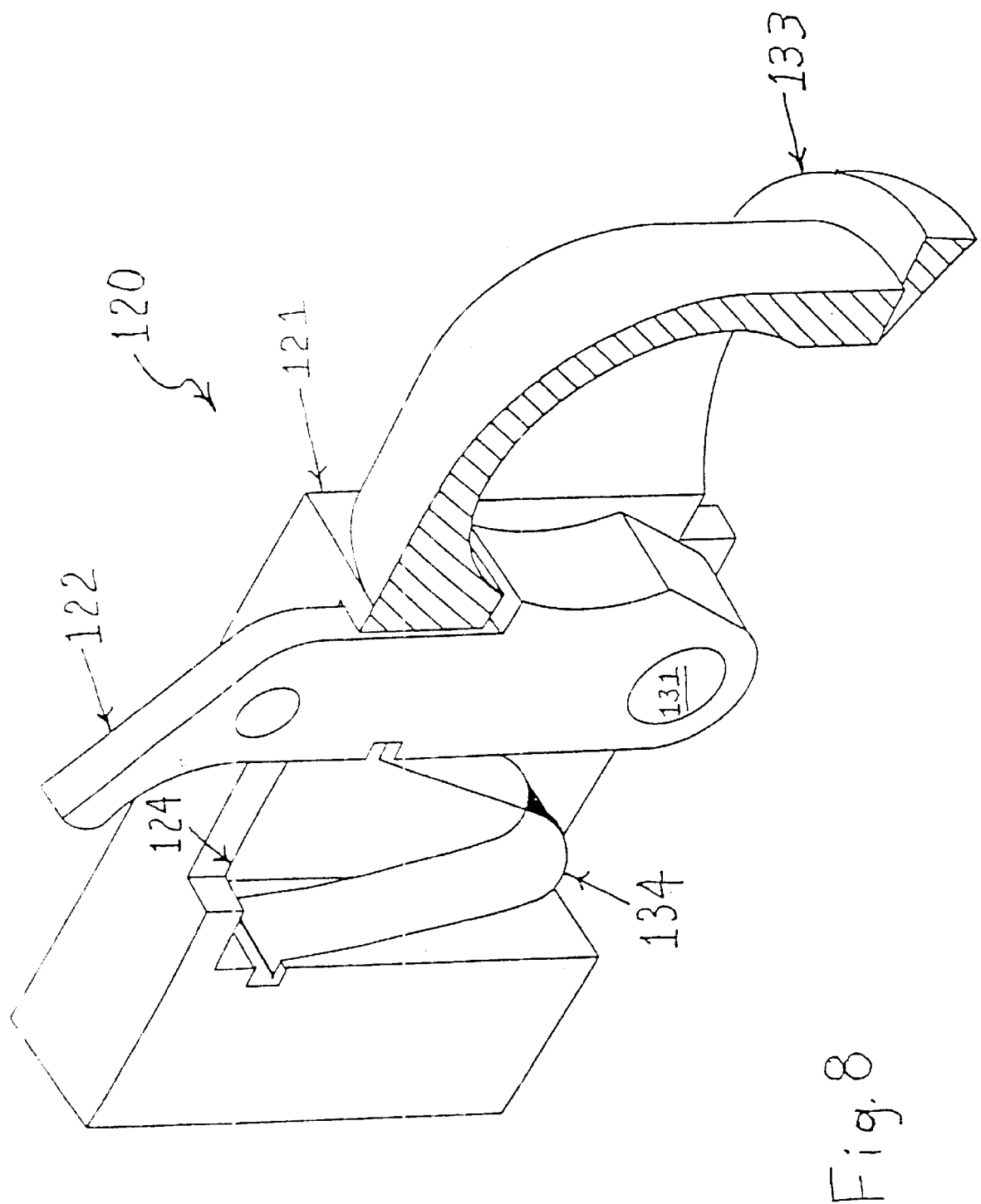
FIG. 8 is an oblique view of an embodiment of the device, cut along cutting plane 7—7.

FIGS. 6–8 depict an additional embodiment 120 of the invention wherein the pivoting ball support 122 extends upwardly through a frame slot 124 such that the pivoting ball support 122 can be pushed by hand to move the pivoting ball support 122 from its first position to its second position. In this embodiment no handle is needed and the pivoting ball support 122 need not rotate with the pivoting ball support pivot point 131. For this reason, the pivoting ball support pivot point 131 may be welded or otherwise affixed to the frame 121.

FIG. 6 also depicts a frame top extension 126 having a hole 128 positioned adjacent the pivoting ball support top extension hole 130, such that a pin or lock can be inserted simultaneously through both holes 128,130, thus locking the pivoting ball support face 132 into its first position. An exterior frame lip 133 provides structural rigidity and assists in guiding the hitch ball during the hookup process.

FIG. 8 depicts a U-spring 134, which may be adapted to all embodiments of the invention.

Figure 9:
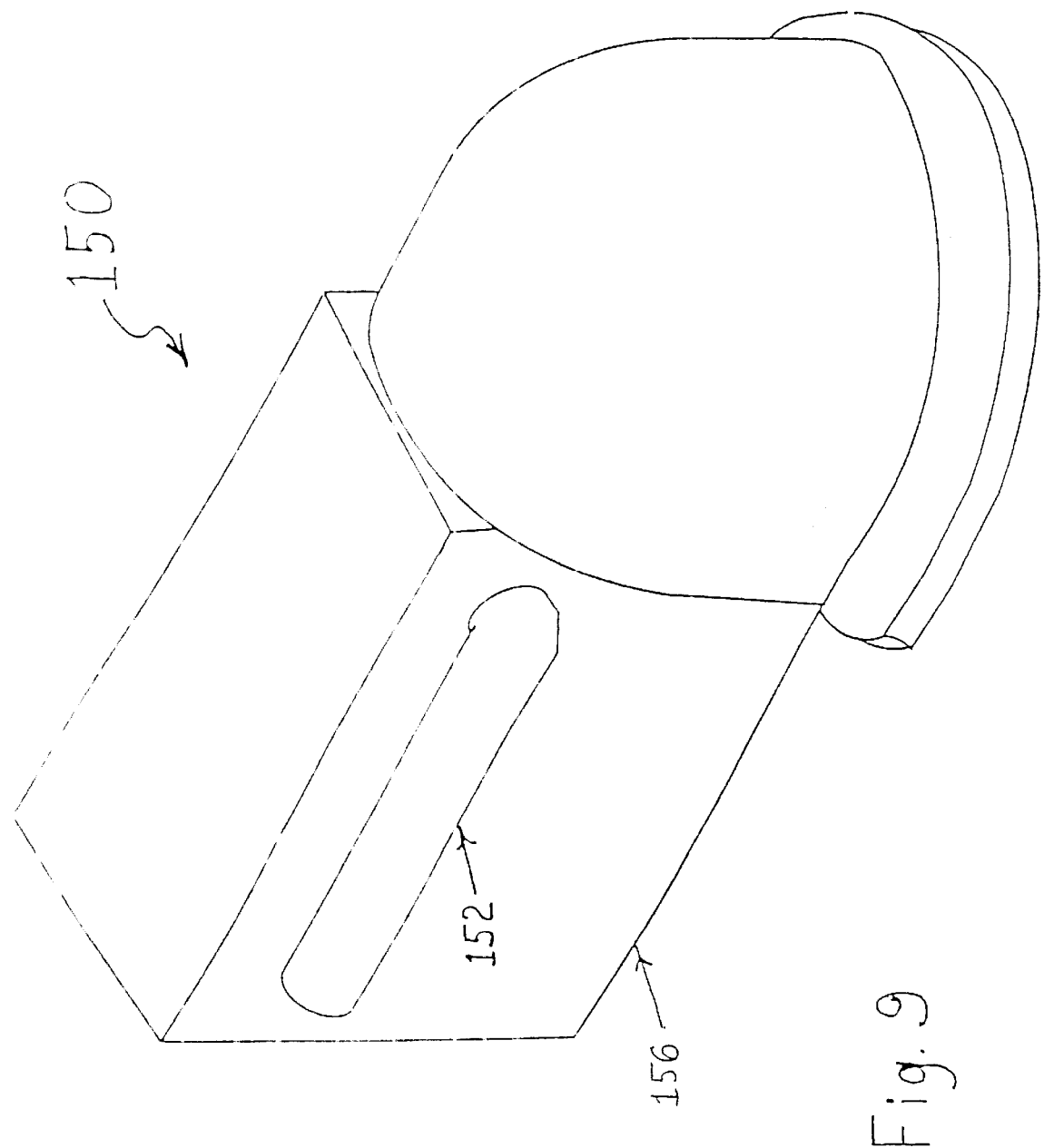
FIG. 9 is an oblique view of an embodiment of the device.
Figure 10:
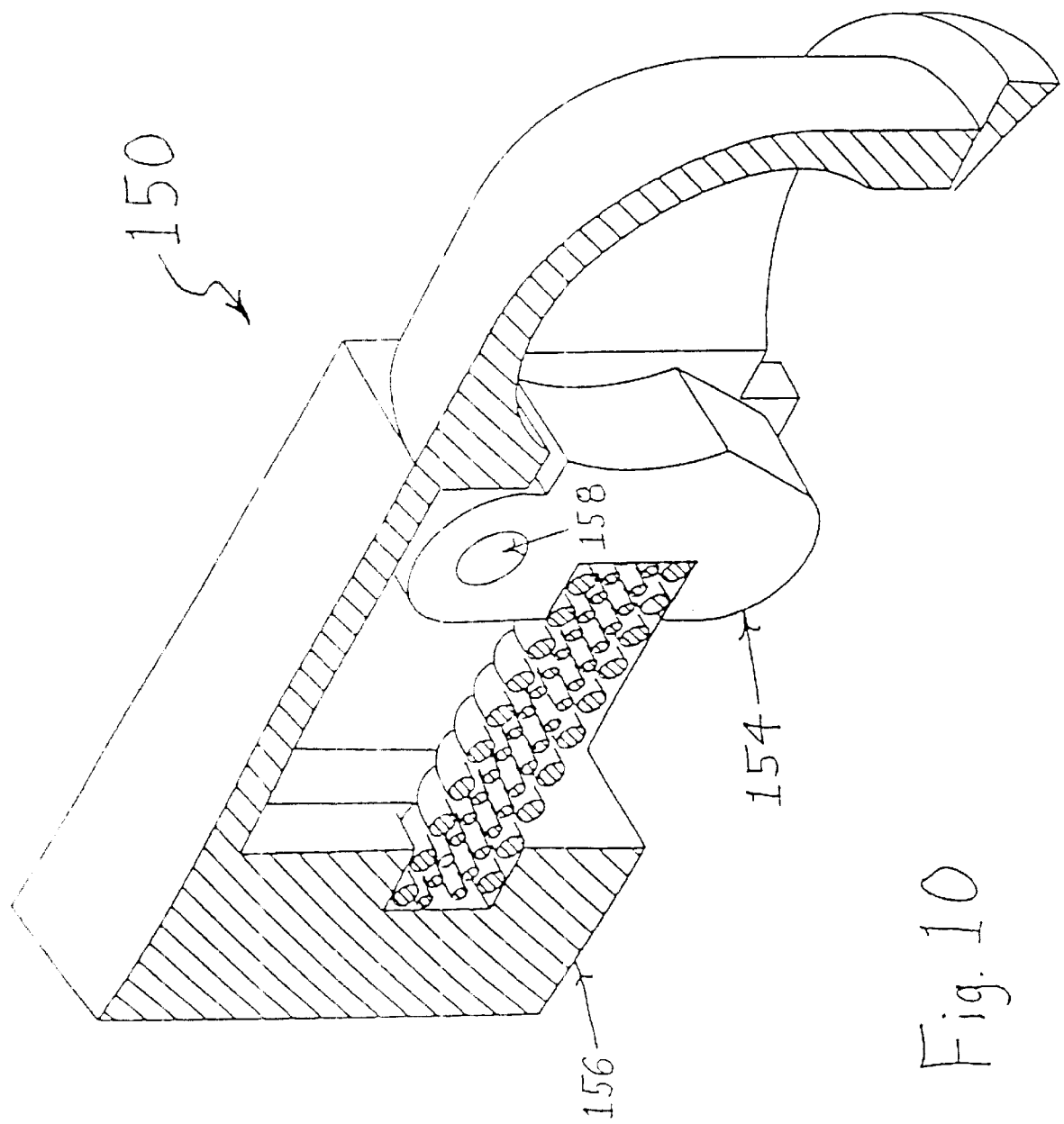
FIG. 10 is an oblique view of an embodiment of the device, cut along cutting plane 10—10.

FIGS. 9–10 depict an embodiment 150 of the invention wherein the handle 152 is attached to the pivoting ball support 154 in such a manner that it is moved in an upward, clockwise direction in order to move the pivoting ball support 154 from its first position to its second position.

Figure 11:
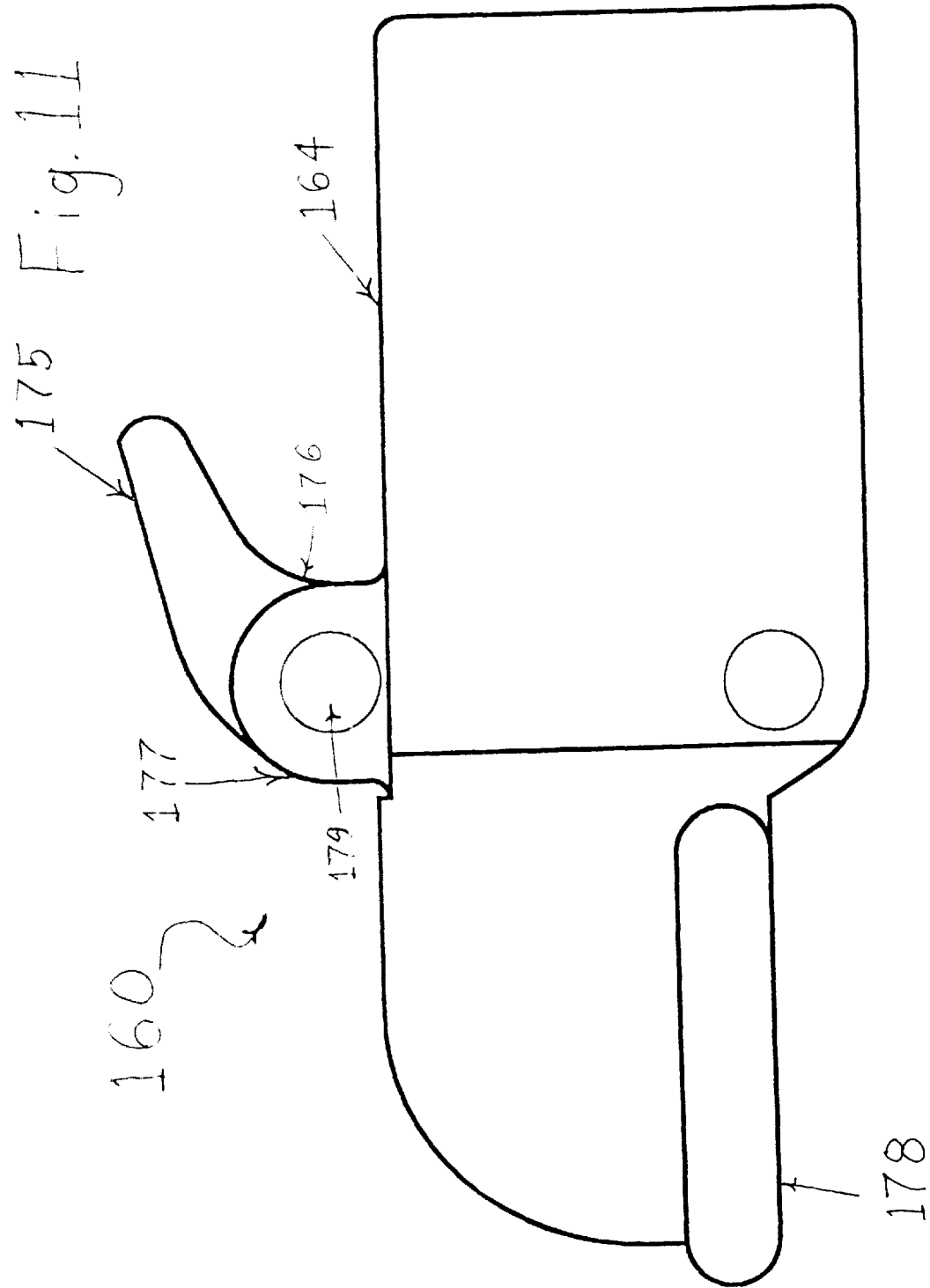
FIG. 11 is a side view of an embodiment of the device.
Figure 12:
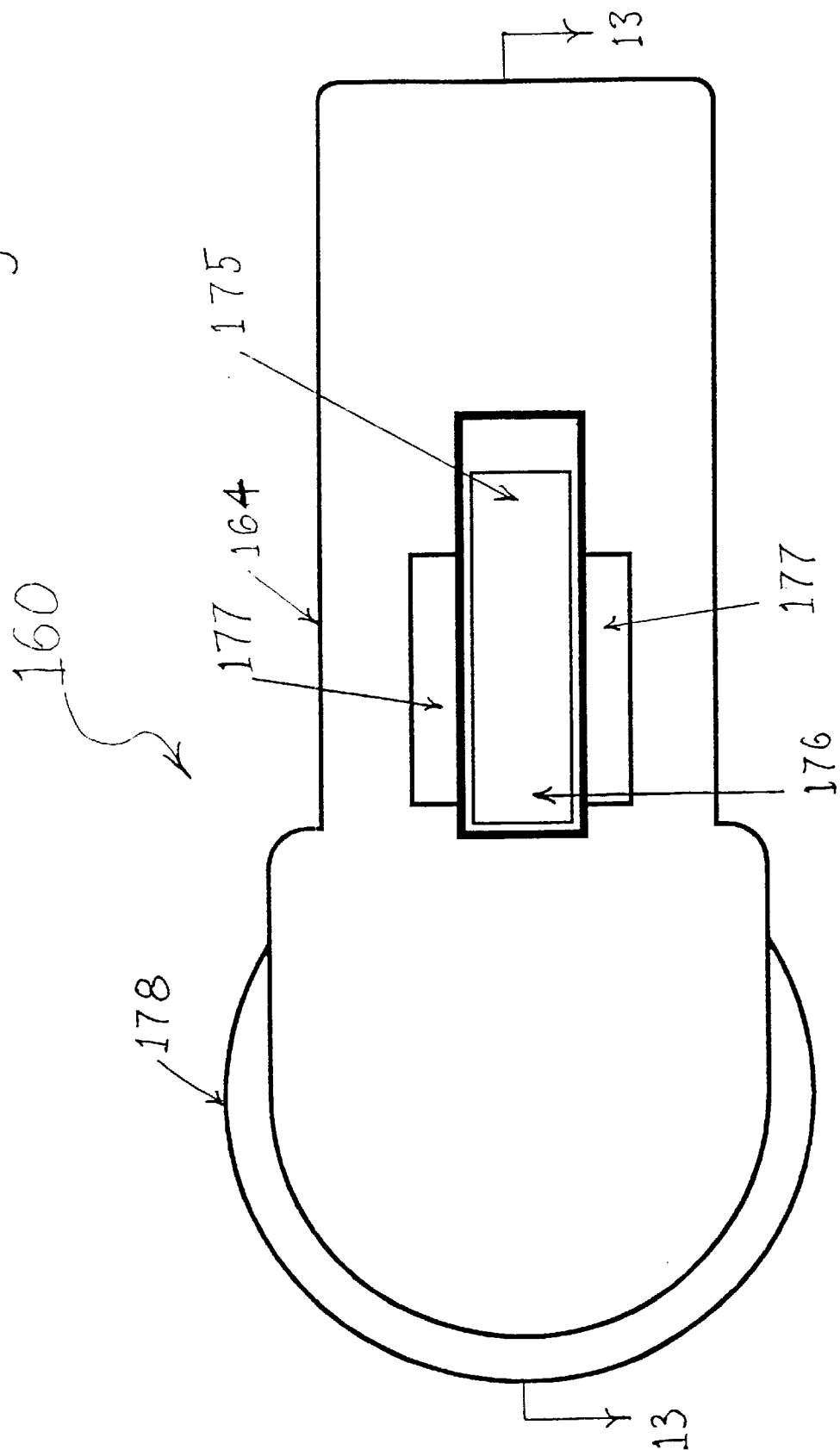
FIG. 12 is a top view of the embodiment shown in FIG. 11.

FIGS. 11–13 depict an additional embodiment of the hitch 160, which has been re-configured in some respects, from the embodiments of FIGS. 1–10. Furthermore, a cavity 162 is present in the frame 164, which reduces the weight. Hollows 167 and 168 are formed in the pivoting ball support 169 and the frame rear interior section interior surface 170, respectively. The hollows 167, 168 receive the spring 171 first end 172 and second end 173. An optional backup spring 174 is likewise secured. A pivoting ball support end portion 175 extends from the pivoting ball support top extension 176, forming an acute angle with the frame 164. Frame top extensions 177, frame exterior lip 178, frame interior lip 165, and pivoting ball support top extension hole 179, are also shown. This embodiment of the hitch 160 appears to have the optimum configuration based on my current experience, although other adjustments to such configurations may occur to those of skill in the art after review of this disclosure.

Figure 15:
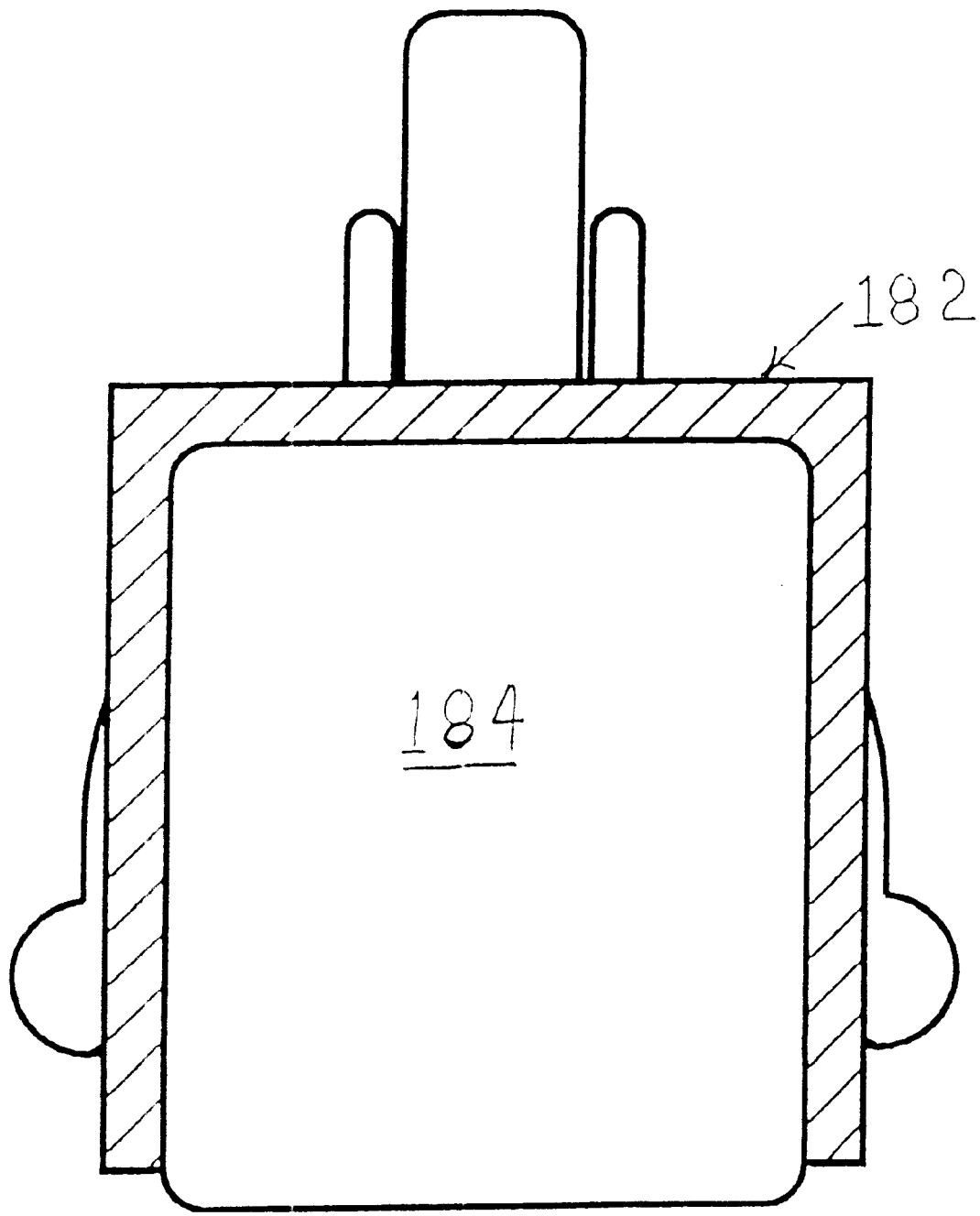
FIG. 15 is a rear view of the embodiment shown in FIG. 14, cut along cutting plane 15—15.

FIG. 14 depicts an embodiment 180 which includes the addition of channel structure 182. The channel structure 182 attaches, or is adaptable for attachment, to the frame 14,121, 156,164 of the embodiments shown in FIGS. 1–4 and 6–13. The channel structure 182 extends rearwardly, and as shown in FIG. 15, has a rearwardly facing channel-shaped opening 184 sized to closely receive rectangular structure, e.g., square tubing (not shown) extending from the trailer. The square tubing or other rectangular structure may be welded or otherwise attached to the channel structure 182. The channel structure 182 can be positioned with respect to the frame 14,121,156,164 such that the pivoting ball support pivot point 42,131,158,166 can be secured within the frame 14,121,156,164 in those embodiments wherein the pivoting ball support pivot point 42,131,158,160 extends, or can be extended, through the frame 14,121,156,164 such as those embodiments in FIGS. 1–4 and 6–13.

Figure 16:
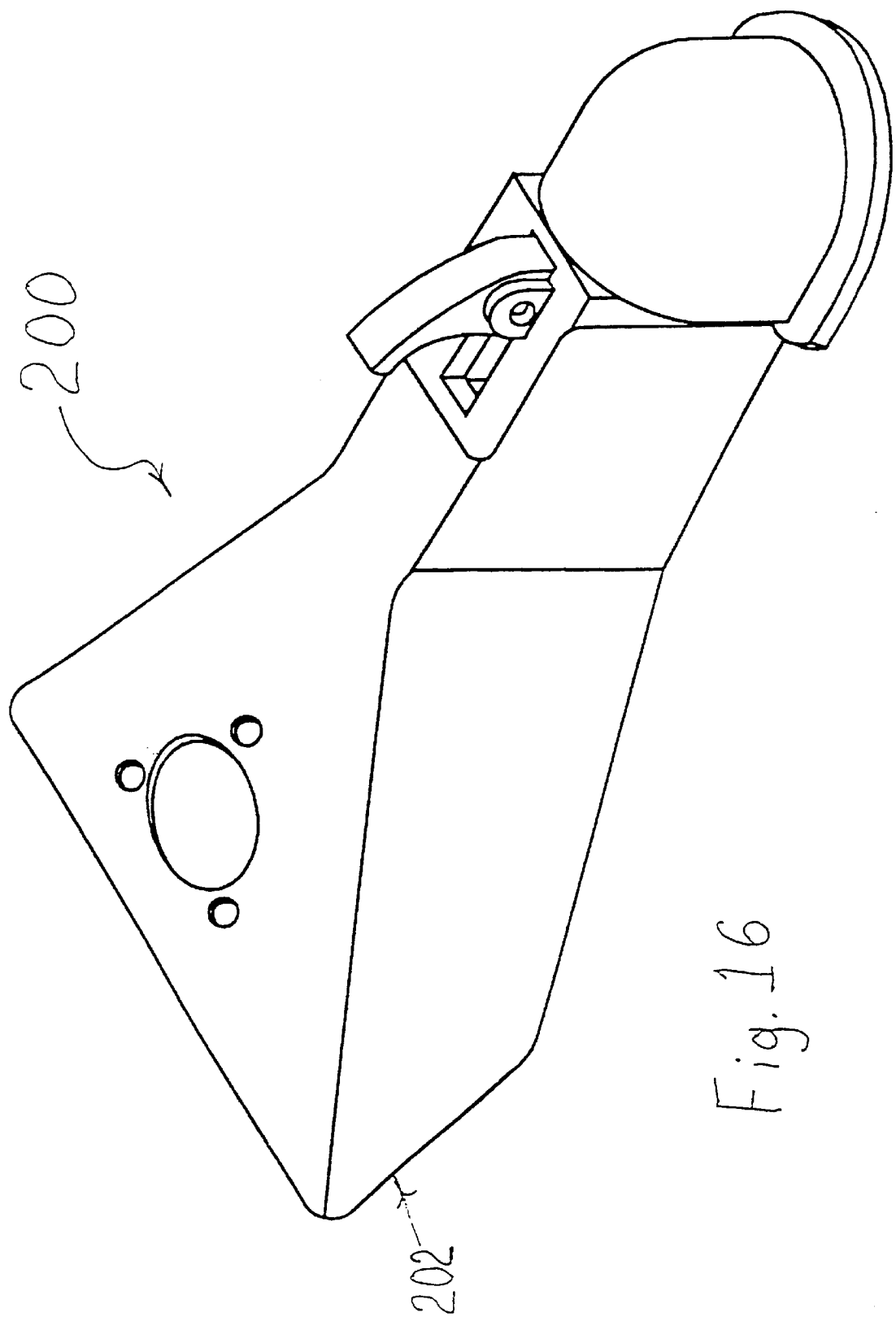
FIG. 16 is an oblique view of an embodiment of the device.
Figure 17:
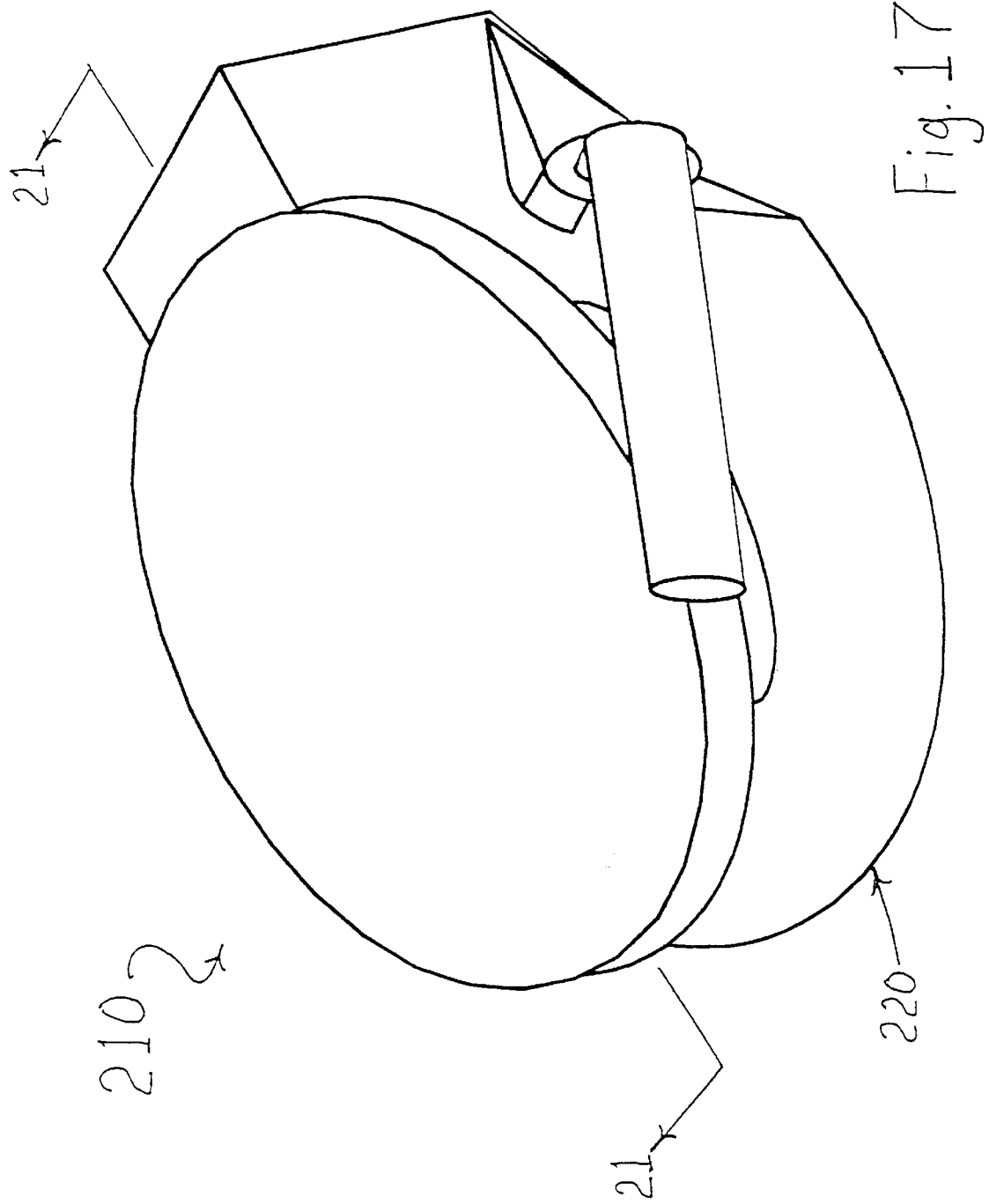
FIG. 17 is an oblique view of an embodiment of the device showing a gooseneck adaptation.
Figure 18:
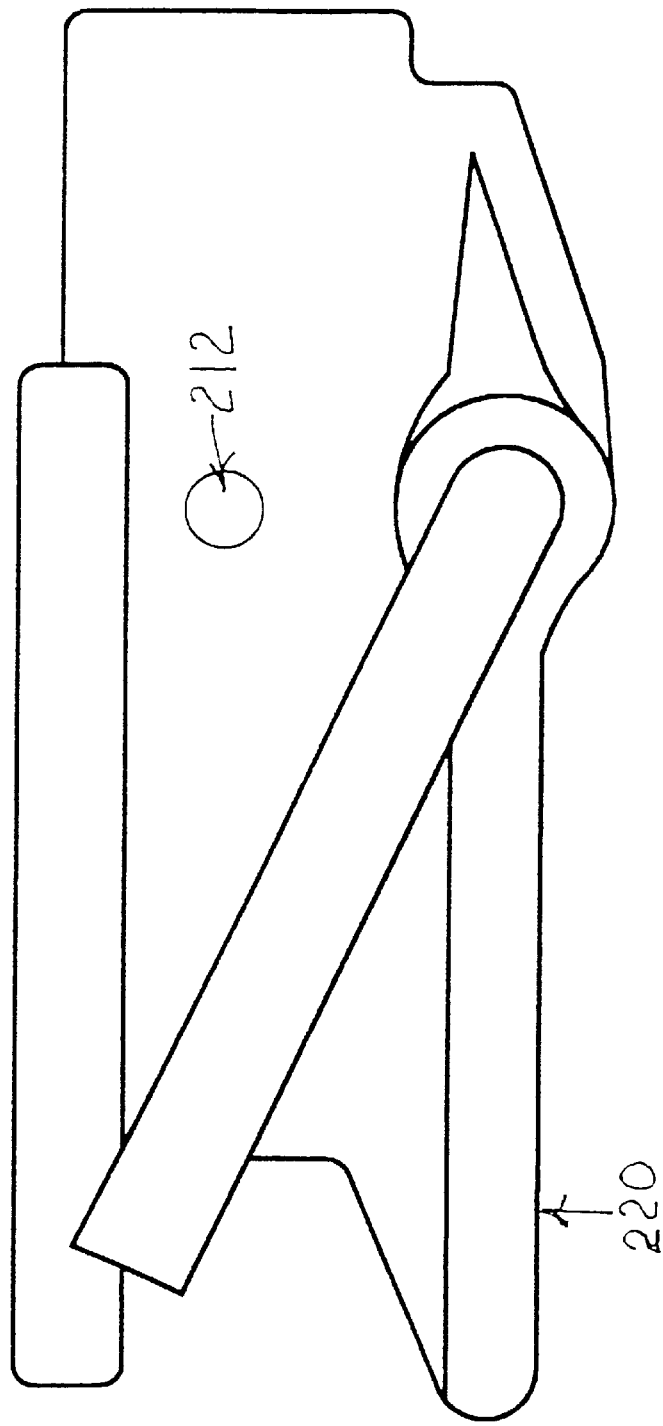
FIG. 18 is a side view of the embodiment shown in FIG. 18.
Figure 19:
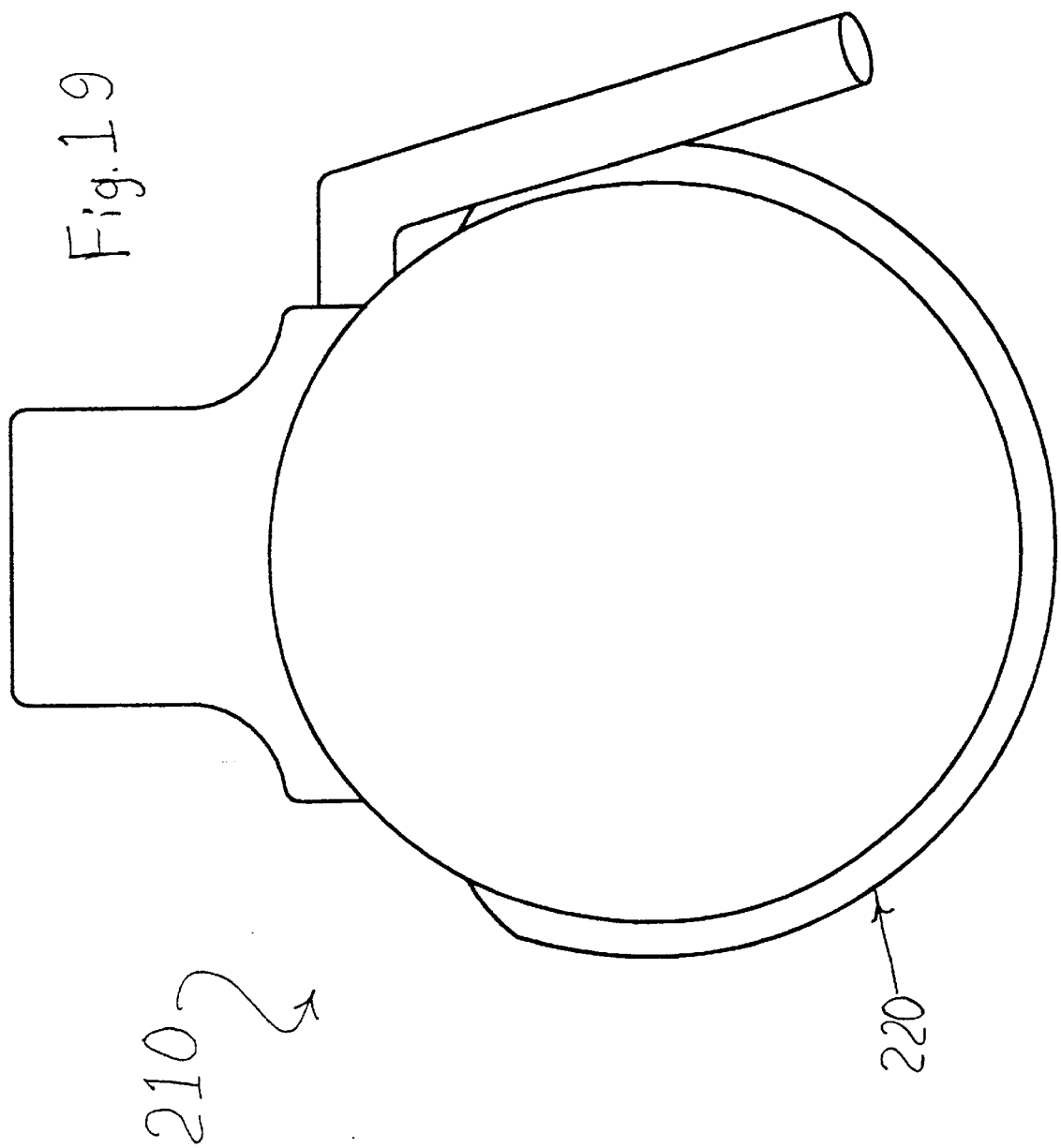
FIG. 19 is a top view of the embodiment shown in FIG. 17.
Figure 20:
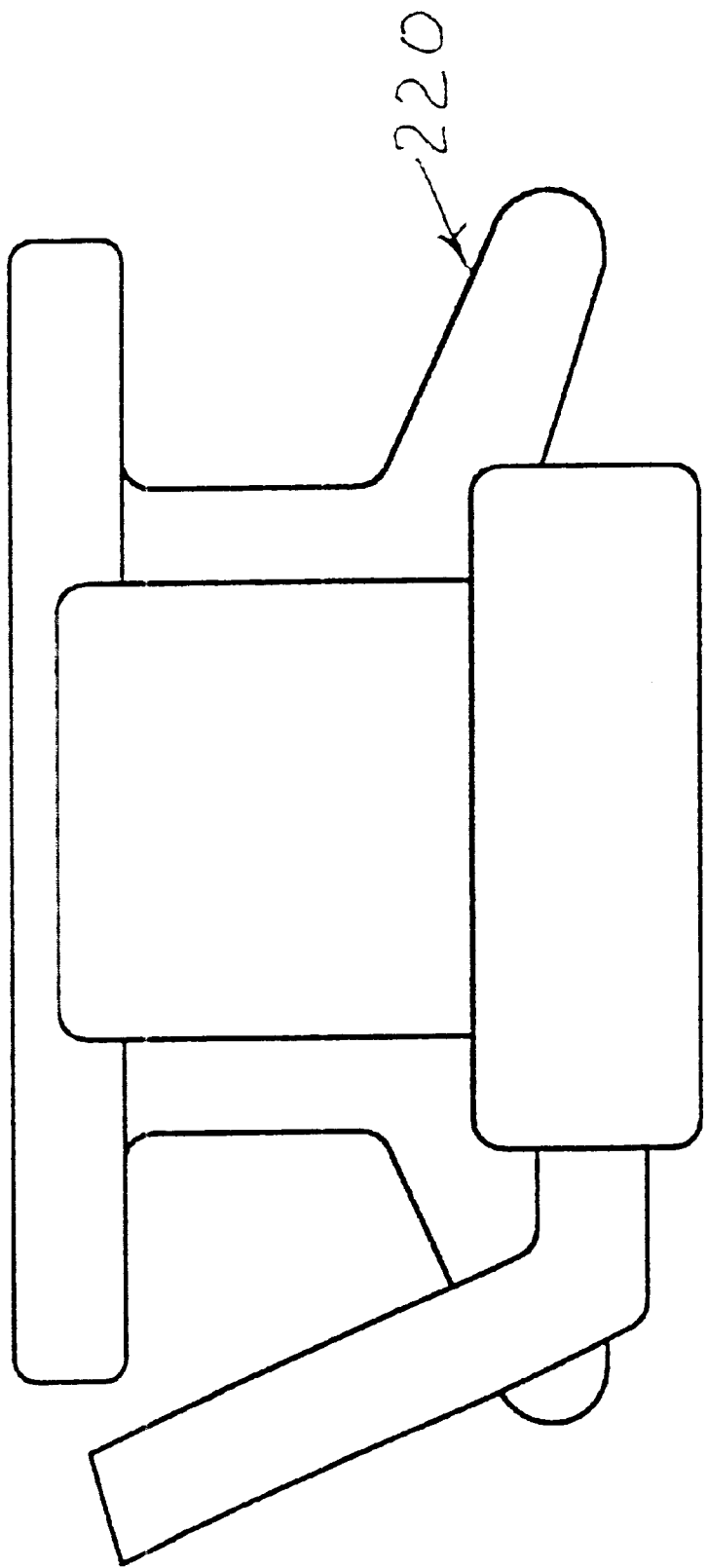
FIG. 20 is a rear view of the embodiment shown in FIG. 17.

Similarly, FIG. 16, depicts an embodiment 200 which includes an A-frame structure 202. The A-frame structure 202 attaches, or is adaptable for attachment, to the frame 42,131,158,160 and extends rearwardly to closely receive trailer tongue structure (not shown). Other structures for joining my device to particular trailer structures will occur to those of skill in the art upon review of this disclosure.

Figure 21:
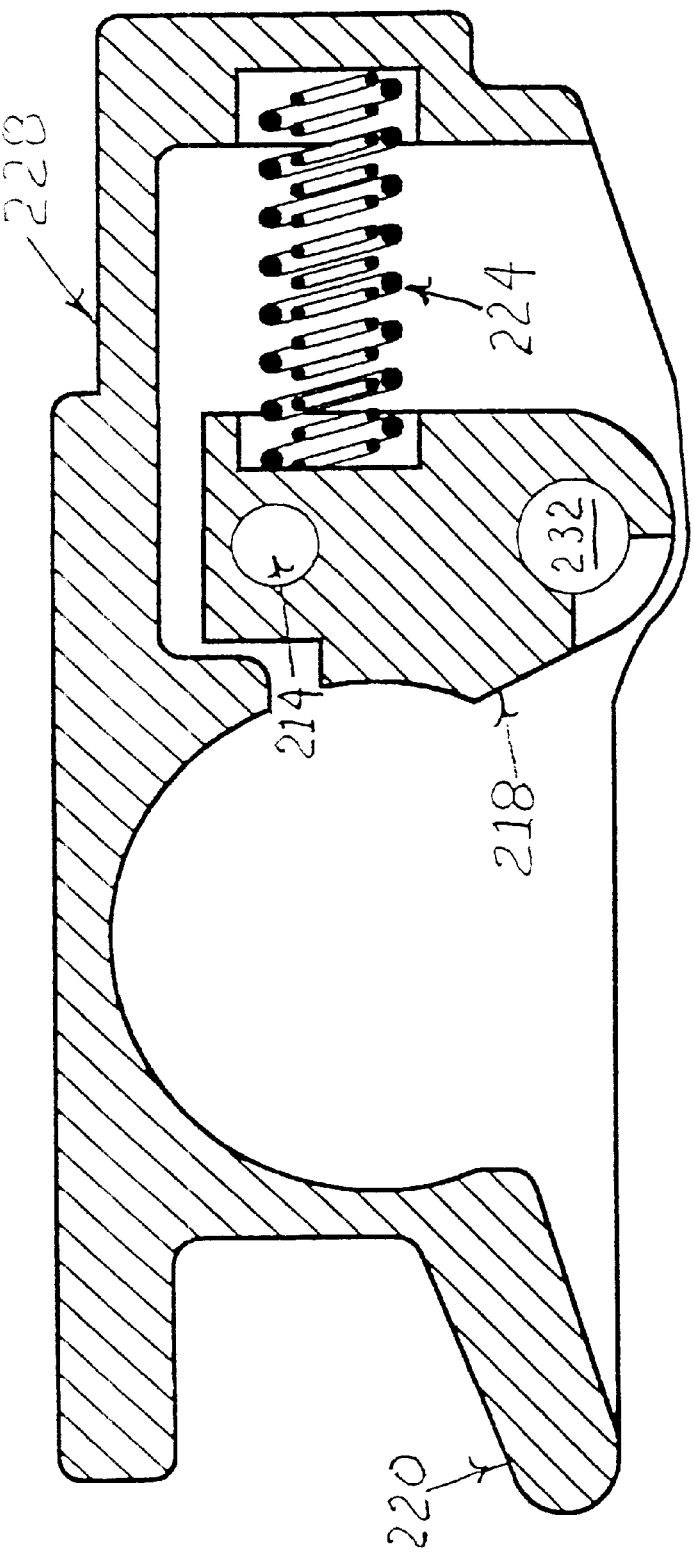
FIG. 21 is a side view of the embodiment of the device shown in FIG. 17, cut along cutting plane 21—21.
Figure 22:
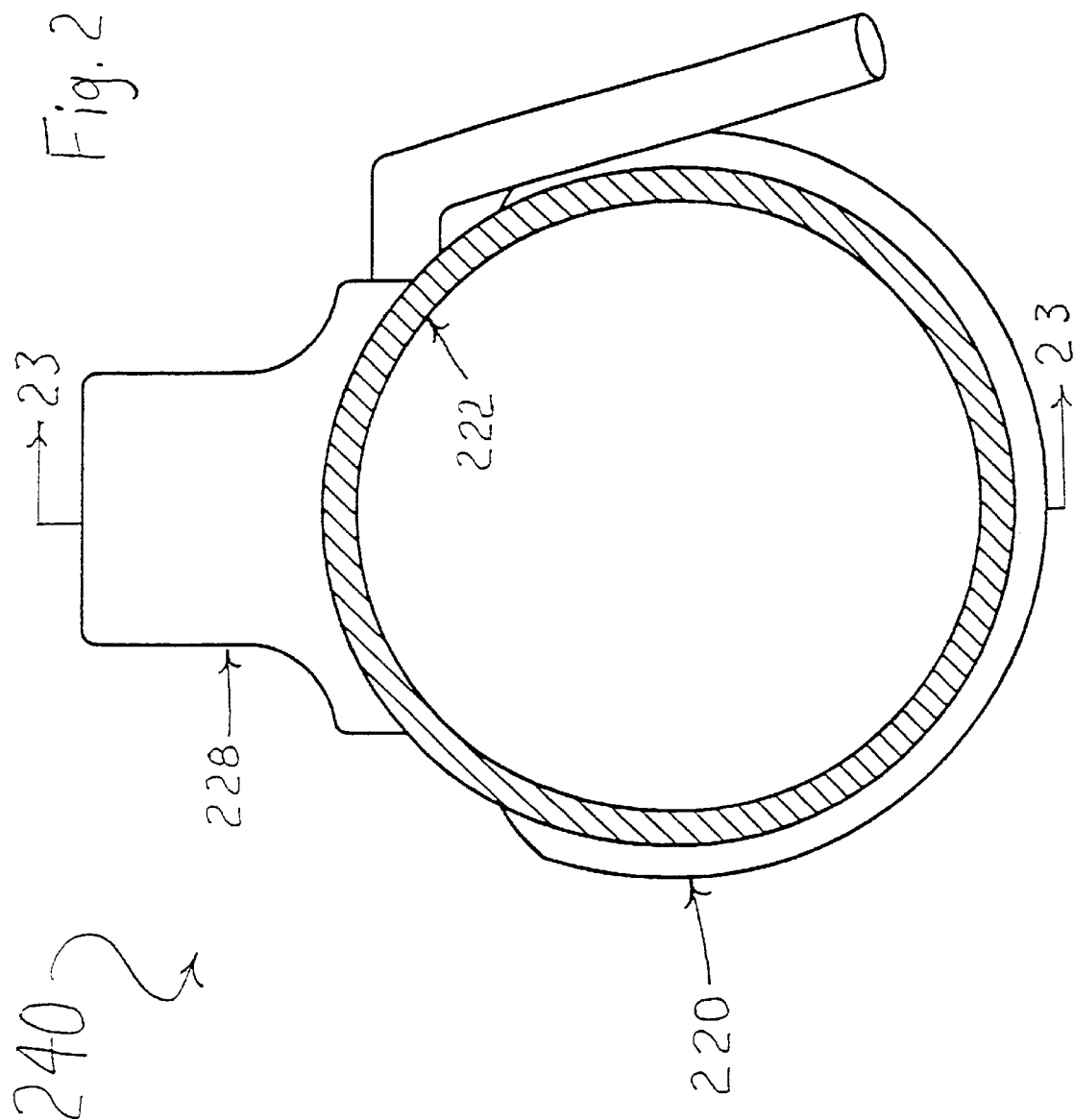
FIG. 22 is a top view of the embodiment of the device shown in FIG. 17, including a cut away view of the added top structure.
Figure 23:
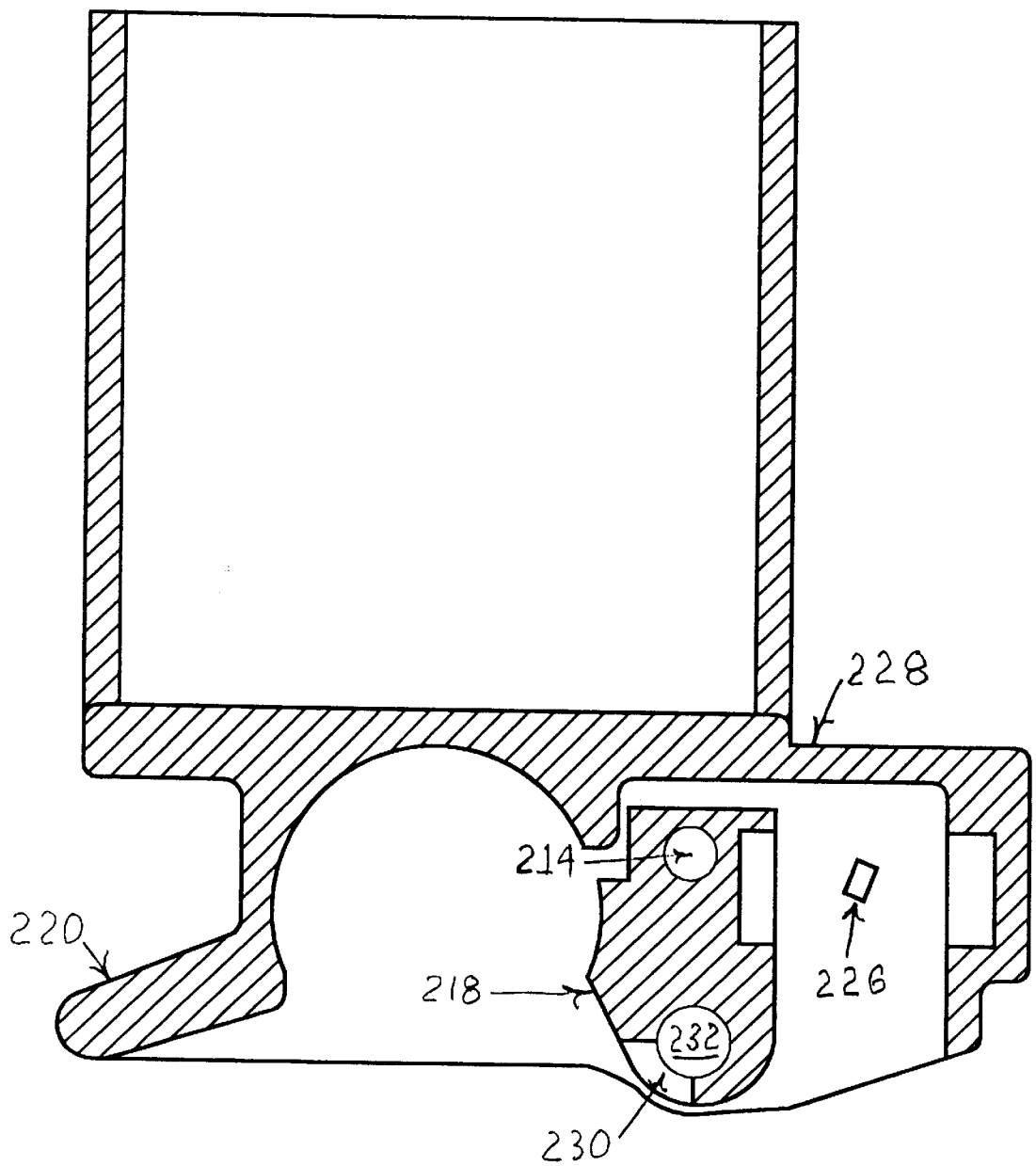
FIG. 23 is a side view of the embodiment of the device shown in FIG. 22, cut along cutting plane 23—23.
Figure 24:
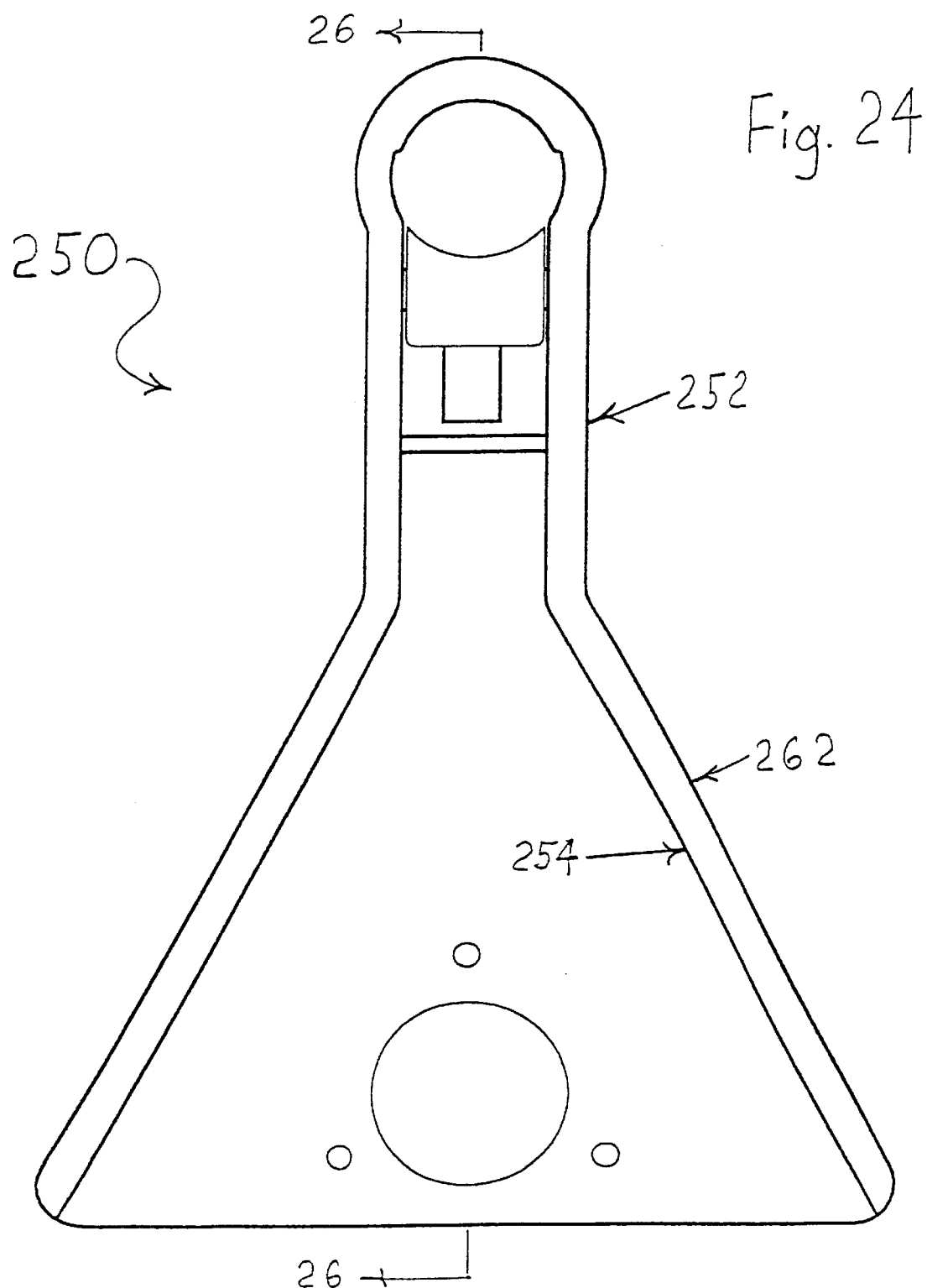
FIG. 24 is a bottom view of an embodiment of the device.
Figure 25:
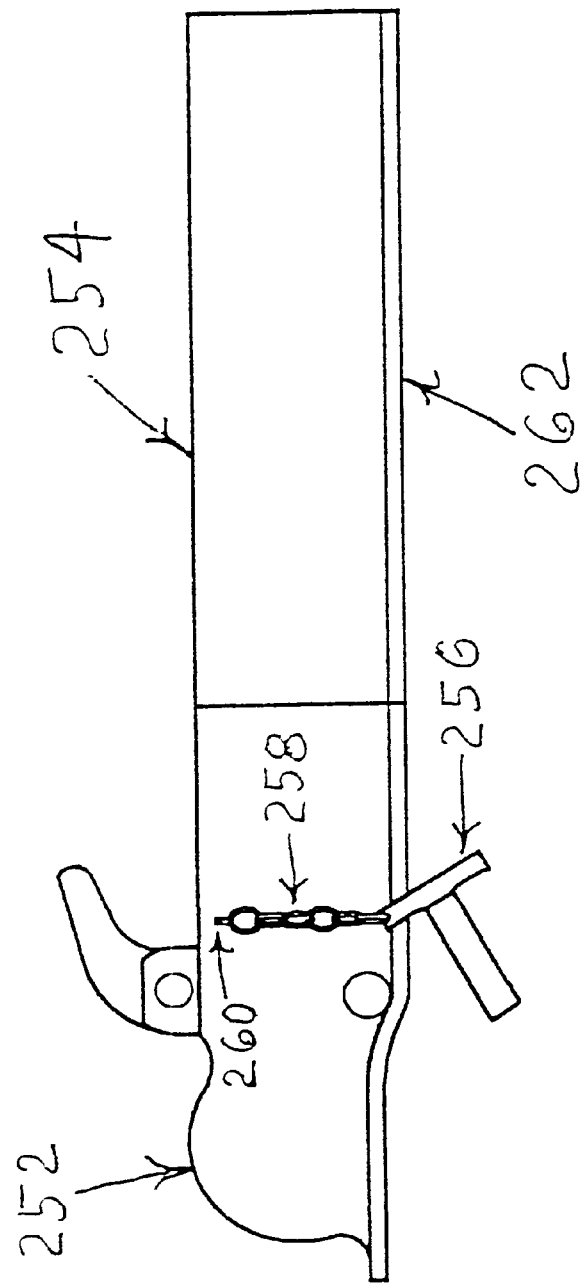
FIG. 25 is a side view of the device shown in FIG. 24.

FIGS. 17–23 depict an additional "gooseneck" embodiments 210 and 240. Although similar to FIG. 5, these embodiments include holes 212,214 in the frame 216 and pivoting ball support 218 which are aligned and sized for closely receiving a pin (not shown). An exterior frame lip 220, is also included. FIGS. 22–23 also depict vertical pipe structure 222, which is included for the purposes described with regard to FIG. 5, above. The springs 224 shown in FIG. 21 are excluded from FIG. 23 such that a pivoting ball support stop 226 is revealed, which extends from one or both sides of the frame 228. The extension is such that the pivoting ball support 218 rotation is halted by contact between the pivoting ball support 218 and one or more of the pivoting ball support stops 226. A weld access opening 230 is originally present in the pivoting ball support 218 to allow the pivoting ball support 218 to be welded to the pivoting ball support pivot point 232. It is anticipated that all, or substantially all of such welding access hole 230 will be filled by weld material.

FIGS. 24–27 depict an additional embodiment 250 in which the frame 252 and the A-frame structure 254 are fashioned from pressed or stamped steel in a one-piece configuration. This configuration and manufacturing method will allow a simpler attachment of structures such as the A-frame structure 254 shown, and other structures for special trailer attachment requirements, such as the channel structure 182 shown in FIGS. 14–15. Such other structures, and the re-configurations of the hitch necessary to support this manufacturing method will occur to those skilled in the art upon review of this disclosure and as various trailer structures are presented for attachment. A pin 256, pin chain 258, and pin chain attachment point 260 are depicted on FIG. 25. This configuration and manufacturing method also includes a structural lip 262 extending along the frame 252 and A-frame structure 254. For clarity the spring(s) are not shown in FIGS. 24, 26–27.

FIG. 28 depicts a typical embodiment 270 illustrates relationship between R, X, and Y which is believed to provide functionally satisfactory results for all embodiments of my invention, including embodiments utilized to secure balls of varying sizes. R is the radius of the ball housing, i.e., that portion of the frame front interior section 272 which most closely receives the ball. The distances Y and X identify the position for the center of rotation of the pivoting ball support pivot point 274. As my invention is utilized in various embodiments, the identification of permissible tolerances in the relationship between R, X, and Y will occur to those of skill in the art after review of this disclosure.

The simple and effective coupling and coupling release features of my invention will be used for many applications other than trailer hitches. For example, embodiments of varying sizes are included for providing gate and door latch functions. Other embodiments are included wherein my invention can be sized and configured as necessary for the most efficient coupling performance, including, recessed and/or integrated positioning of the invention within the structure to be coupled, as well as, vertical, upside down, angled and sideways installations. Embodiments are included wherein the structure to which the ball is attached is not aligned with the structure to which my invention is attached. In other embodiments the structure to which the ball is attached does not lie in the same plane as the frame on my invention. Also included are applications in which my invention will include the ball and/or the attachment structure to secure the ball to the portion of structure to be coupled. A wide variety of materials may be used for the components in any embodiment of my invention, particularly those embodiments used to couple lighter weight structures. Plastics, other metals, wood and other materials may be utilized. Other coupling applications will occur to those of skill in the art after review of this disclosure.

The features of many of the embodiments discussed above are interchangeable with other embodiments, and it is contemplated that additional embodiments will be practiced using various combinations of such features.

Although the present invention has been described in considerable detail with reference to certain embodiments thereof, other embodiments are possible. The illustrated or described embodiments are given by way of example only and other embodiments will occur to those of skill.

What is claimed is:

1. An apparatus for receiving and securing a hitch ball, comprising:
   a frame, the frame having an interior, the frame interior having a front section and a rear section, the frame front interior section being shaped and sized for closely receiving portions of a generally round hitch ball, the frame further having a downwardly facing opening, the frame opening being shaped and positioned to allow hitch ball passage into the frame front interior section;
   a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the hitch ball positioned in the frame front interior section, the pivoting ball support further having a face, the pivoting ball support face being movable from a first position to a second position, the pivoting ball support face first position being such that the pivoting ball support face is at least partially beneath a portion of the hitch ball when the hitch ball is within the frame front interior section, the frame front interior section being sized and shaped such that the pivoting ball support face prevents the hitch ball from passing through the frame opening;

pivoting ball support movement prevention means, such that movement of the pivoting ball support face from the first position to the second position is prevented;

pivoting ball support movement resistance means, such that movement of the pivoting ball support face from its first position to its second position is resisted; and pivoting ball support forced rotation means, such that the pivoting ball support face can be manually moved from the first to the second position.

2. The apparatus of claim 1, wherein the pivoting ball support movement resistance means comprises the pivoting ball support pivot point and the pivoting ball support face, the pivoting ball support pivot point and the pivoting ball support face being configured with respect to the frame front interior section, such that the force exerted by the hitch ball on the pivoting ball support face tends to rotate the pivoting ball support face about the pivoting ball support pivot point in a manner such that the pivoting ball support face stays in, or is moved toward, the first position.

3. The apparatus of claim 2, wherein the pivoting ball support movement resistance means further comprises the frame, the frame further having a frame rear interior section interior surface, and a spring, the spring having a first and second end, the spring's first end being positioned against the pivoting ball support, the spring's second end being positioned against the frame rear interior section interior surface.

4. The apparatus of claim 1, further comprising the frame, the frame further having a lip, the frame lip being shaped and positioned to extend beneath a portion of the hitch ball positioned in the frame front interior section.

5. The apparatus of claim 4, further comprising the frame, the frame further having a frame front interior section interior surface, the frame front interior section interior surface having a rear part extending downwardly between the frame front and rear interior sections, such that, when the fully inserted hitch ball seeks to move in a rearward direction, substantial portions of the rear of the hitch ball will encounter the frame front interior section interior surface rear part.

6. The apparatus of claim 5, further comprising the frame lip, the frame lip further having a rearmost edge, and the frame front interior section interior surface, the frame front interior section interior surface further having a rearmost edge, the frame lip rearmost edge and the frame front interior section interior surface rearmost edge being sized and shaped such that a line between such edges, lying on a plane cut through the center of the fully inserted hitch ball, passes through or below the center of the ball.

7. The apparatus of claim 5, further comprising the frame lip and the frame front interior section interior surface, the frame lip and the frame front interior section interior surface being shaped and sized such that, as the hitch ball is inserted into the frame front interior section, the frame front interior section interior surface urges the hitch ball to a position such that a portion of the hitch ball is above the frame lip when the hitch ball is fully inserted.

8. The apparatus of claim 4, further comprising the frame, the frame further having a frame front interior section interior surface, the frame lip extending, in a generally arc shaped fashion, on and along the frame front interior section interior surface, approximately 45 degrees on either side of the longitudinal axis of the frame, when measured on a circle having a center coincident with the fully inserted hitch ball's center.

9. The apparatus of claim 4, further comprising the frame lip, the frame lip further having a frame lip face, the frame lip face being generally concave and sized such that the frame lip face is substantially flush with the fully inserted hitch ball.

10. The apparatus of claim 1, further comprising the frame, the frame further having a frame front interior section interior surface, the frame front interior section interior surface having a rear part extending downwardly between the frame front and rear interior sections, such that, when the fully inserted hitch ball seeks to move in a rearward direction, substantial portions of the rear of the hitch ball will encounter the frame front interior section interior surface rear part.

11. The apparatus of claim 10, wherein the frame front interior section interior surface rear part extends from 15 degrees to 90 degrees along the circumference of a circle having a center coincident with the center of the fully inserted hitch ball.

12. The apparatus of claim 10, wherein the pivoting ball support movement resistance means further comprises the frame, the frame further having a frame rear interior section interior surface, and a spring, the spring having a first and second end, the spring's first end being positioned against the pivoting ball support, the spring's second end being positioned against the frame rear interior section interior surface.

13. The apparatus of claim 10, further comprising the frame, the frame further having a lip, the frame lip being shaped and positioned to extend beneath a portion of the hitch ball positioned in the frame front interior section.

14. The apparatus of claim 13, further comprising the frame lip, the frame lip further having a rearmost edge, and the frame front interior section interior surface, the frame front interior section interior surface further having a rearmost edge, the frame lip rearmost edge and the frame front interior section interior surface rearmost edge being sized and shaped such that a line between such edges, lying on a plane cut through the center of the fully inserted hitch ball, passes below the center of the ball.

15. The apparatus of claim 13, further comprising the frame lip and the frame front interior section interior surface, the frame lip and the frame front interior section interior surface being shaped and sized such that, as the hitch ball is inserted into the frame front interior section, the frame front interior section interior surface urges the hitch ball to a position such that a portion of the hitch ball is above the frame lip when the hitch ball is fully inserted.

16. The apparatus of claim 1, further comprising the pivoting ball support face, the pivoting ball support face being further shaped and sized to closely follow the circumference of the adjacent portions of the hitch ball, in a plane cut through the center of the fully inserted hitch ball.

17. The apparatus of claim 16, wherein the pivoting ball support face follows the hitch ball circumference through at least 30 degrees.

18. The apparatus of claim 1, further comprising the pivoting ball support and the frame opening, the pivoting ball support further having a bottom end and the frame opening further having a rear section corresponding generally with the frame rear interior section, the pivoting ball support being further sized and positioned such that the pivoting ball support bottom end does not extend below the frame opening rear section.

19. The apparatus of claim 1, wherein the pivoting ball support movement resistance means comprises:
the frame, the frame further having a frame rear interior section interior surface;
and a plurality of springs, the springs each having a first and second end, each spring's first end being positioned against the pivoting ball support, each spring's second end being positioned against the frame rear interior section interior surface.

20. The apparatus of claim 1, wherein the pivoting ball support forced rotation means comprises a handle, the handle being attached to the pivoting ball support such that movement of the handle causes rotation of the pivoting ball support about the pivoting ball support pivot point.

21. The apparatus of claim 20, wherein the pivoting ball support is positioned such that its clockwise rotation about the pivoting ball support pivot point moves the pivoting ball support from its first position to its second position.

22. The apparatus of claim 20, wherein the handle is attached to the pivoting ball support above the pivoting ball support pivot point.

23. The apparatus of claim 20, further comprising the pivoting ball support pivot point, the pivoting ball support pivot point having a first and second end, and two handles, the first handle being attached to the pivoting ball support pivot point first end, the second handle being attached to the pivoting ball support pivot point second end.

24. The apparatus of claim 20, further comprising the pivoting ball support pivot point, the pivoting ball support pivot point having a first and second end, and the handle, the handle being attached to the pivoting ball support pivot point first end and second end.

25. The apparatus of claim 20, wherein the handle is shaped and configured such that it runs in a generally rearward direction along the frame when the pivoting ball support face is in its first position.

26. The apparatus of claim 20, wherein the handle is shaped and configured such that it runs in a generally forward direction along the frame when the pivoting ball support face is in its first position.

27. The apparatus of claim 20, wherein the handle is shaped and configured such that it runs substantially flush to the frame when the pivoting ball support face is in its first position.

28. The apparatus of claim 20, wherein the handle is "T" shaped.

29. The apparatus of claim 20, further comprising handle gripping means.

30. The apparatus of claim 20, further comprising a handle hook, the handle hook being attached to the frame, the handle hook being shaped and positioned such that the handle is received and held by the handle hook when the pivoting ball support face is in its first position.

31. The apparatus of claim 20, wherein the handle is shaped and configured such that, with respect to the horizontal, it runs at an angle of sufficient magnitude to allow the handle to be readily gripped when the frame is positioned substantially flush to a horizontal surface and the pivoting ball support face is in its first position.

32. The apparatus of claim 31, wherein the referenced angle is 10 to 90 degrees from the horizontal.

33. The apparatus of claim 1, further comprising pivoting ball support movement prevention means, such that movement of the pivoting ball support face from the first position to the second position is prevented.

34. The apparatus of claim 1, further comprising a frame exterior lip, the frame exterior lip being attached to the frame proximate the frame downwardly facing opening, the frame exterior lip further extending radially from the frame downwardly facing opening, the frame exterior lip being tapered downwardly as it extends.

35. The apparatus of claim 1, further comprising a pivoting ball support stop, the pivoting ball support stop being attached to the frame interior rear section and positioned such that movement of the pivoting ball support is halted when the pivoting ball support encounters the pivoting ball support stop.

36. The apparatus of claim 1, wherein the pivoting ball support rotates with respect to the pivoting ball support pivot point, the pivoting ball support pivot point being fixed with respect to the frame.

37. The device of claim 1, further comprising a channel structure, the channel structure being attached to the frame and extending rearwardly, the channel structure being shaped to closely receive all or a portion of each of three sides of a rectangular structure.

38. The device of claim 1, further comprising an A-frame structure, the channel structure being attached to the frame and extending rearwardly, the A-frame structure being shaped to closely receive a V-shaped structure.

39. The apparatus of claim 1, wherein the frame further has a top surface and a slot and the pivoting ball support forced rotation means further comprises an extension member extending from the pivoting ball support through the frame slot, the pivoting ball support extension member having an end portion, the end portion having a top surface, the end portion being rearwardly disposed such that the end portion top surface forms an acute angle with the frame top surface.

40. The apparatus claim 39, wherein the handle end is hinged to the fourth member and to the gooseneck trailer.

41. The apparatus of claim 1, wherein the pivoting ball support movement prevention means comprises:
the frame, the frame further having a slot and a top extension, the frame top extension having a hole; and
the pivoting ball support, the pivoting ball support further having a top extension, the pivoting ball support top extension having a hole, the pivoting ball support top extension being configured such that the pivoting ball support top extension extends through the frame slot, the frame top extension being positioned on the frame such that the pivoting ball support top extension hole coincides with the frame top extension hole, when the pivoting ball support face is in the first position, such that a pin may be simultaneously positioned within the pivoting ball support top extension hole and the frame top extension hole.

42. The apparatus of claim 1, wherein the frame front interior section has a radius equal to one-half of the diameter of the ball after said diameter has been increased by approximately 0.02 inches, and further wherein said radius is approximately equal to the distance between the vertical centerlines of the pivot point and the spherical portion of the received ball minus 0.676 inches, and further wherein said radius is approximately equal to the distance between the horizontal centerlines of the pivot point and the spherical portion of the received ball plus 0.238 inches.

43. The device of claim 42 wherein the approximation is limited by a variation in the distance between the vertical centerlines of between +/−0.02 inches, and a variation in the distance between the horizontal centerlines of between +/−0.02 inches.

44. An apparatus for receiving and securing a hitch ball, comprising:

a frame, the frame having an interior, the frame interior having a front section and a rear section, the frame front interior section being shaped and sized for closely receiving portions of a generally round hitch ball, the frame further having a downwardly facing opening, the frame opening being shaped and positioned to allow hitch ball passage into the frame front interior section;

a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the hitch ball positioned in the frame front interior section, the pivoting ball support further having a face, the pivoting ball support face being movable from a first position to a second position, the pivoting ball support face first position being such that the pivoting ball support face is at least partially beneath a portion of the hitch ball when the hitch ball is within the frame front interior section, the frame front interior section being sized and shaped such that the pivoting ball support face prevents the hitch ball from passing through the frame opening;

pivoting ball support movement prevention means, such that movement of the pivoting ball support face from the first position to the second position is prevented; and pivoting ball support forced rotation means, such that the pivoting ball support face can be manually moved from the first to the second position after disablement of the pivoting ball support movement prevention means.

45. The apparatus of claim 44, wherein the pivoting ball support movement prevention means comprises the frame, the frame further having a slot, and the pivoting ball support, the pivoting ball support further having a top extension, the pivoting ball support top extension having a hole, the pivoting ball support top extension being configured such that the pivoting ball support top extension extends through the frame slot, the amount of such extension being limited such that a pin of substantially the same diameter as the pivoting ball support top extension hole, will be against the frame when the pivoting ball support face is in its first position and the pin is inserted in the pivoting ball support top extension hole.

46. The apparatus of claim 44, wherein the pivoting ball support forced rotation means comprises the frame, the frame further having a slot, and the pivoting ball support, the pivoting ball support having a top extension, the pivoting ball support top extension being configured such that the pivoting ball support top extension extends through the frame slot.

47. The apparatus of claim 44, wherein the pivoting ball support movement prevention means comprises:

the frame, the frame further having a slot and a top extension, the frame top extension having a hole; and the pivoting ball support, the pivoting ball support further having a top extension, the pivoting ball support top extension having a hole, the pivoting ball support top extension being configured such that the pivoting ball support top extension extends through the frame slot, the frame top extension being positioned on the frame such that the pivoting ball support top extension hole coincides with the frame top extension hole, when the pivoting ball support face is in the first position, such that a pin may be simultaneously positioned within the pivoting ball support top extension hole and the frame top extension hole.

48. The apparatus of claim 44, wherein the pivoting ball support movement prevention means comprises:

the frame, the frame further having a slot;

the pivoting ball support, the pivoting ball support further having a top extension, the pivoting ball support top extension having a hole; and a pin, the pin being shaped to be closely received by the pivoting ball support top extension hole, the pivoting ball support top extension being configured such that the pivoting ball support top extension extends through the frame slot, the amount of such extension being limited such that the pin will be against the frame, when the pivoting ball support face is in its first position and the pin is inserted in the pivoting ball support top extension hole.

49. The apparatus of claim 48, further comprising pin connecting means, such that the pin remains connected to the apparatus when the pin is removed from the pivoting ball support top extension hole.

50. The apparatus of claim 48, further comprising:

the pin, the pin further having a first end and a second end; and a pin ring, the pin ring being rotatably attached to the pin first end, such that when rotated the pin ring snugly encompasses the pin second end.

51. The apparatus of claim 48, wherein the pivoting ball support movement prevention means comprises:

the frame, the frame further having a slot and a top extension, the frame top extension having a hole;

the pivoting ball support, the pivoting ball support further having a top extension, the pivoting ball support top extension having a hole; and a pin, the pin being shaped to be closely received by the frame top extension hole and the pivoting ball support top extension hole, the pivoting ball support top extension being configured such that the pivoting ball support top extension extends through the frame slot, the frame top extension being positioned on the frame such that the pivoting ball support top extension hole coincides with the frame top extension hole, when the pivoting ball support face is in the first position.

52. The apparatus of claim 44, wherein the pivoting ball support movement prevention means comprises:

the frame, the frame further having a slot;

the pivoting ball support, the pivoting ball support further having a top extension, the pivoting ball support top extension being configured such that the pivoting ball support top extension extends through the frame slot; and a slot plug, the slot plug being pivotally attached to the frame, the slot plug being sized and shaped such that when pivoted the slot plug nestles in, and is closely received by, the frame slot, such that the pivoting ball support is prevented from moving from its first position.

53. The apparatus of claim 44, wherein the pivoting ball support forced rotation means comprises a handle, the handle being attached to the pivoting ball support such that movement of the handle causes rotation of the pivoting ball support about the pivoting ball support pivot point.

54. The apparatus of claim 53, further comprising:
the frame, the frame further having a slot;
the pivoting ball support, the pivoting ball support further having a top extension extending through the frame slot; and
the handle, the handle being attached to the pivoting ball support top extension.

55. The apparatus of claim 44, further comprising a frame exterior lip, the frame exterior lip being attached to the frame proximate the frame downwardly facing opening, the frame exterior lip further extending radially from the frame downwardly facing opening, the frame exterior lip being tapered downwardly as it extends.

56. The apparatus of claim 44, wherein the pivoting ball support rotates with respect to the pivoting ball support pivot point, the pivoting ball support pivot point being fixed with respect to the frame.

57. The apparatus of claim 44, wherein the pivoting ball support movement prevention means comprises:
the frame, the frame further having a hole; and
the pivoting ball support, the pivoting ball support further having a hole, the pivoting ball support hole and the frame hole being aligned when the pivoting ball support is in the first position, the pivoting ball support hole and the frame hole being sized to closely receive a pin.

58. The apparatus of claim 57, wherein the pivoting ball support hole further comprises a plurality of holes.

59. The apparatus of claim 44, wherein the pivoting ball support movement prevention means comprises:
the frame, the frame further having a hole;
the pivoting ball support, the pivoting ball support further having a hole; and
a pin, the pin being shaped to be closely received by the pivoting ball support hole and the frame hole.

60. The apparatus of claim 44, wherein the frame further has a top surface and a slot and the pivoting ball support forced rotation means further comprises an extension member extending from the pivoting ball support through the frame slot, the pivoting ball support extension member having an end portion, the end portion having a top surface, the end portion being rearwardly disposed such that the end portion top surface forms an acute angle with the frame top surface.

61. An apparatus for receiving and securing a ball, comprising:
a frame, the frame having an interior, the frame interior having a front section and a rear section, the frame front interior section being shaped and sized for closely receiving portions of a generally round ball, the frame further having a downwardly facing opening, the frame opening being shaped and positioned to allow ball passage into the frame front interior section, the frame further having a slot and a top extension, the frame top extension having a hole;
a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the ball positioned in the frame front interior section, the pivoting ball support further having a face, the pivoting ball support face being movable from a first position to a second position, the pivoting ball support face first position being such that the pivoting ball support face is at least partially beneath a portion of the ball when the ball is within the frame front interior section, the frame front interior section being sized and shaped such that the pivoting ball support face prevents the ball from passing through the frame opening, the pivoting ball support further having a top extension, the pivoting ball support top extension having a hole, the pivoting ball support top extension being configured such that the pivoting ball support top extension extends through the frame slot, the frame top extension being positioned on the frame such that the pivoting ball support top extension hole coincides with the frame top extension hole, when the pivoting ball support face is in the first position; and
a rotation member for rotating the pivoting ball support about the pivoting ball support pivot point.

62. The apparatus of claim 61, wherein the rotation member comprises the pivoting ball support top extension, the pivoting ball support top extension having a first end positioned for pushing by hand.

63. The apparatus of claim 61, wherein the rotation member comprises a handle, the handle being attached to the pivoting ball support such that movement of the handle causes rotation of the pivoting ball support about the pivoting ball support pivot point.

64. The apparatus of claim 61, wherein the rotation member is attached to the pivoting ball support top extension.

65. The apparatus of claim 61, further comprising a frame exterior lip, the frame exterior lip being attached to the frame proximate the frame downwardly facing opening, the frame exterior lip further extending radially from the frame downwardly facing opening, the frame exterior lip being tapered downwardly as it extends.

66. The apparatus of claim 61, wherein the frame further has a top surface and the pivoting ball support top extension further comprises an end portion, the end portion having a top surface, the end portion being rearwardly disposed such that the end portion top surface forms an acute angle with the frame top surface.

67. An apparatus for receiving and securing a ball, comprising:
a frame, the frame having an interior, the frame interior having a front section and a rear section, the frame front interior section being shaped and sized for closely receiving portions of a generally round ball, the frame further having an opening, the frame opening being shaped and positioned to allow ball passage into the frame front interior section;
a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the ball positioned in the frame front interior section, the pivoting ball support further having a face, the pivoting ball support face being movable from a first position to a second position, the pivoting ball support face first position being such that the pivoting ball support face is at least partially beneath a portion of the ball when the ball is within the frame front interior section, the frame front interior section being sized and shaped such that the pivoting ball support face prevents the ball from passing through the frame opening;

pivoting ball support movement prevention means, such that movement of the pivoting ball support face from the first position to the second position is prevented;

pivoting ball support movement resistance means, such that movement of the pivoting ball support face from its first position to its second position is resisted;, and pivoting ball support forced rotation means, such that the pivoting ball support face can be manually moved from the first to the second position.

68. An apparatus for receiving and securing a ball, comprising:

a frame, the frame having an interior, the frame interior having a front section and a rear section, the frame front interior section being shaped and sized for closely receiving portions of a generally round ball, the frame further having an opening, the frame opening being shaped and positioned to allow ball passage into the frame front interior section;

a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the ball positioned in the frame front interior section, the pivoting ball support further having a face, the pivoting ball support face being movable from a first position to a second position, the pivoting ball support face first position being such that the pivoting ball support face is at least partially beneath a portion of the ball when the ball is within the frame front interior section, the frame front interior section being sized and shaped such that the pivoting ball support face prevents the ball from passing through the frame opening;

pivoting ball support movement prevention means, such that movement of the pivoting ball support face from the first position to the second position is prevented; and pivoting ball support forced rotation means, such that the pivoting ball support face can be manually moved from the first to the second position after disablement of the pivoting ball support movement prevention means.

69. An apparatus for receiving and securing a hitch ball, comprising:

a frame, the frame having an interior, the frame interior having a front section and a rear section, the frame front interior section being shaped and sized for closely receiving portions of a generally round hitch ball, the frame further having a downwardly facing opening, the frame opening being shaped and positioned to allow hitch ball passage into the frame front interior section;

a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the hitch ball positioned in the frame front interior section, the pivoting ball support further having a face, the pivoting ball support face being movable from a first position to a second position, the pivoting ball support face first position being such that the pivoting ball support face is at least partially beneath a portion of the hitch ball when the hitch ball is within the frame front interior section, the frame front interior section being sized and shaped such that the pivoting ball support face prevents the hitch ball from passing through the frame opening;

pivoting ball support movement resistance means, such that movement of the pivoting ball support face from its first position to its second position is resisted;

pivoting ball support movement prevention means, such that movement of the pivoting ball support face from its first position to its second position is prevented; and pivoting ball support forced rotation means, such that the pivoting ball support face can be manually moved from the first to the second position.

70. An apparatus for receiving and securing a ball, comprising:

a frame, the frame having an interior, the frame interior having a front section and a rear section, the frame front interior section being shaped and sized for closely receiving portions of a generally round ball, the frame further having a downwardly facing opening, the frame opening being shaped and positioned to allow ball passage into the frame front interior section, the frame further having a slot and a top extension, the frame slot having a front and the frame top extension having a hole;

a pivoting ball support, the pivoting ball support having a pivot point, the pivoting ball support rotating with respect to the pivoting ball support pivot point, the pivot point being fixed with respect to the frame, the pivoting ball support pivot point being located within the frame rear interior section, the pivoting ball support's pivot motion being oriented for substantially perpendicular movement with respect to the ball positioned in the frame front interior section, the pivoting ball support further having a face, the pivoting ball support face being movable from a first position to a second position, the pivoting ball support face first position being such that the pivoting ball support face is at least partially beneath a portion of the ball when the ball is within the frame front interior section, the frame front interior section being sized and shaped such that the pivoting ball support face prevents the ball from passing through the frame opening, the pivoting ball support further having a top extension, the pivoting ball support top extension having a front edge and a hole, the pivoting ball support top extension being configured such that the pivoting ball support top extension extends through the frame slot, the frame top extension being positioned on the frame such that the pivoting ball support top extension hole coincides with the frame top extension hole, when the pivoting ball support face is in the first position, the pivoting ball support top extension front edge being spaced from the frame slot front end when the ball is within the frame front interior section and the pivoting ball support is in the first position.

* * * * *